United States Patent [19]
Romesburg

[11] Patent Number: 6,148,078
[45] Date of Patent: Nov. 14, 2000

[54] METHODS AND APPARATUS FOR CONTROLLING ECHO SUPPRESSION IN COMMUNICATIONS SYSTEMS

[75] Inventor: Eric Douglas Romesburg, Chapel Hill, N.C.

[73] Assignee: Ericsson Inc., Research Triangle Park, N.C.

[21] Appl. No.: 09/005,144

[22] Filed: Jan. 9, 1998

[51] Int. Cl.[7] .................................................. H04M 9/00
[52] U.S. Cl. ..................... 379/410; 379/407; 381/94.1
[58] Field of Search ................................. 379/390, 392, 379/406, 407, 409, 410; 455/570; 381/71.1, 94.1, 94.7, 95, 96

[56] References Cited

U.S. PATENT DOCUMENTS

| | | |
|---|---|---|
| 4,577,071 | 3/1986 | Johnston et al. . |
| 5,022,074 | 6/1991 | Nicholas . |
| 5,274,705 | 12/1993 | Younce et al. . |
| 5,283,784 | 2/1994 | Genter . |
| 5,434,916 | 7/1995 | Hasegawa ............................. 379/407 |
| 5,475,731 | 12/1995 | Rasmusson . |
| 5,619,566 | 4/1997 | Fogel . |
| 5,790,657 | 8/1998 | Fujiwara ................................ 379/406 |

FOREIGN PATENT DOCUMENTS

| | | |
|---|---|---|
| 0 739 123A | 10/1996 | European Pat. Off. . |
| 2 295 300A | 5/1996 | United Kingdom . |
| 98 30009A | 7/1998 | WIPO . |

*Primary Examiner*—Wing F. Chan
*Attorney, Agent, or Firm*—Burns, Doane, Swecker & Mathis, L.L.P.

[57] ABSTRACT

Methods and apparatus for controlling echo suppressors provide superior echo attenuation while optimizing perceived signal quality under a variety of conditions. The disclosed techniques provide desired levels of echo attenuation while minimizing the likelihood that an echo suppressor will introduces more attenuation, and thus more signal distortion, than is necessary. In a first exemplary embodiment, an acoustic echo suppressor is deactivated when a voice activity detector indicates that a far-end communications signal does not include a speech component. In a second exemplary embodiment, an attenuation factor of an active acoustic echo canceler is adjusted based upon whether a voice activity detector indicates that a near-end communications signal includes a near-end speech component. In a third exemplary embodiment, a level of attenuation provided by an acoustic echo canceler is adjusted based upon a measured ratio of voice to noise in an audio input to the acoustic echo canceler.

20 Claims, 3 Drawing Sheets

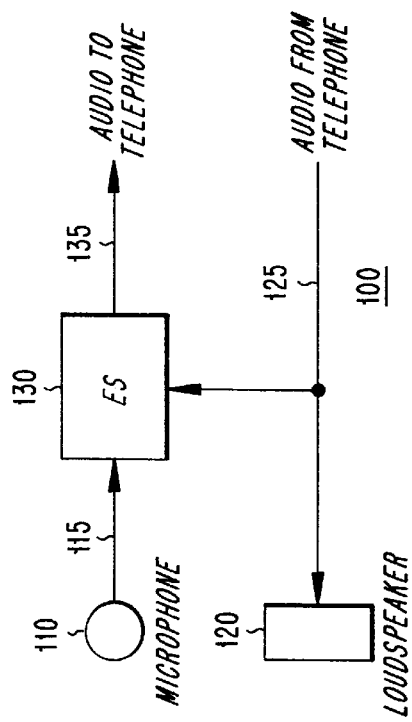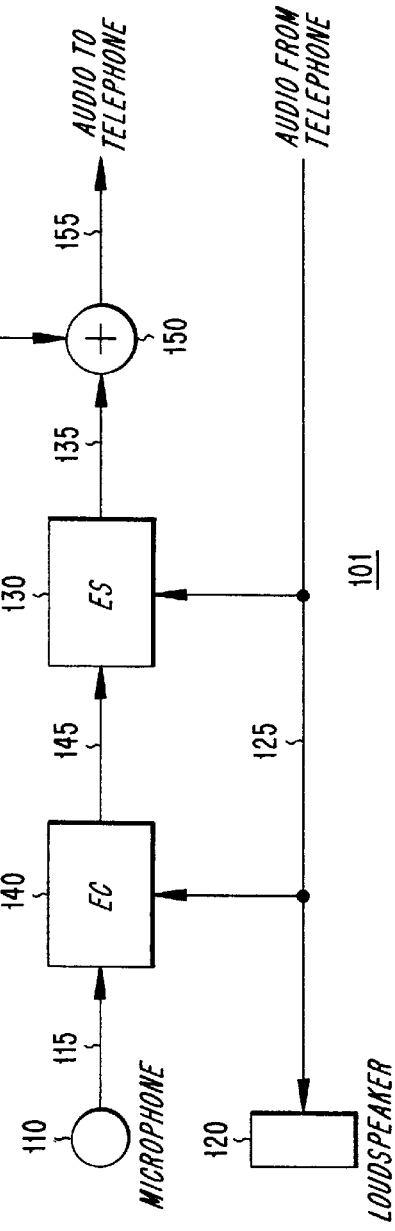

METHODS AND APPARATUS FOR CONTROLLING ECHO SUPPRESSION IN COMMUNICATIONS SYSTEMS

BACKGROUND OF THE INVENTION

The present invention relates to communications systems, and more particularly, to echo suppression in bi-directional communications links.

In many communications systems, for example landline and wireless telephone systems, voice signals are often transmitted between two system users via a bi-directional communications link. In such systems, speech of a near-end user is typically detected by a near-end microphone at one end of the communications link and then transmitted over the link to a far-end loudspeaker for reproduction and presentation to a far-end user. Conversely, speech of the far-end user is detected by a far-end microphone and then transmitted via the communications link to a near-end loudspeaker for reproduction and presentation to the near-end user. At either end of the communications link, loudspeaker output detected by a proximate microphone may be inadvertently transmitted back over the communications link, resulting in what may be unacceptably disruptive feedback, or echo, from a user perspective.

Therefore, in order to avoid transmission of such undesirable echo signals, the microphone acoustic input should be isolated from loudspeaker output as much as possible. With a conventional telephone handset, in which the handset microphone is situated close to the user's mouth while the handset speaker essentially covers the user's ear, the requisite isolation is easily achieved. However, as the physical size of portable telephones has decreased, and as hands-free speaker-phones have become more popular, manufacturers have moved toward designs in which the acoustic path from the loudspeaker to the microphone is not blocked by the user's head or body. As a result, the need for more sophisticated echo suppression techniques has become paramount in modern systems.

The need is particularly pronounced in the case of hands-free automobile telephones, where the closed vehicular environment can cause multiple reflections of a loudspeaker signal to be coupled back to a high-gain hands-free microphone. Movement of the user in the vehicle and changes in the relative directions and strengths of the echo signals, for example as windows are opened and closed or as the user moves his head while driving, further complicate the task of echo suppression in the automobile environment. Additionally, more recently developed digital telephones process speech signals through voice encoders which introduce significant signal delays and create non-linear signal distortions. Such prolonged delays tend to magnify the problem of signal echo from a user perspective, and the additional non-linear distortions make echo suppression by the network equipment more difficult.

In response to the above described challenges, telephone manufacturers have developed a wide variety of echo suppression mechanisms. An exemplary echo suppression system 100 is depicted in FIG. 1A. As shown, the exemplary system 100 includes a microphone 110, a loudspeaker 120 and an echo suppressor 130. An audio output 115 of the microphone 110 is coupled to an audio input of the echo suppressor 130, and an audio output 135 of the echo suppressor 130 serves as a near-end audio input to a telephone (not shown). Additionally, a far-end audio output 125 from the telephone is coupled to an audio input of the loudspeaker 120 and to a reference input of the echo suppressor 130.

In operation, the echo suppressor 130 processes the microphone signal 115 to provide the audio output signal 135 to a far-end telephone user. More specifically, the echo suppressor 130 attenuates the microphone signal 115, in dependence upon the far-end audio signal 125, so that acoustic echo from the loudspeaker 120 to the microphone 110 is not passed back to the far-end telephone user.

Typically, the echo suppressor 130 is either a non-linear, clipping type suppressor or a linear, scaling type suppressor. Clipping type suppressors generally attenuate the microphone output signal 115 by removing a portion of the signal falling within a particular range of values (i.e., within a particular clipping window). Scaling type suppressors, on the other hand, attenuate the microphone output signal 115 by multiplying the signal with an appropriate scale factor. Recently developed hybrid suppressors incorporate both clipping and scaling aspects, for example by scaling a portion of the microphone signal falling within a particular attenuation window. In any case, the level of attenuation (i.e., the clipping window and/or the scale factor) is generally adjusted, either directly or indirectly, in accordance with the amplitude of the far-end audio signal 125 so that the microphone output 115 is attenuated only to the extent the far-end user is speaking.

A conventional clipping type suppressor, known in the art as a center clipper, is described for example in U.S. Pat. No. 5,475,731, entitled "Echo-Canceling System and Method Using Echo Estimate to Modify Error Signal" and issued Dec. 12, 1995 to Rasmusson et al. An alternative clipping type suppressor, known as an AC-Center clipper, is described in copending U.S. patent application Ser. No. 08/775,797, entitled "An AC-Center Clipper for Noise and Echo Suppression in a Communications System" and filed Dec. 31, 1996. An exemplary scaling type suppressor is described in U.S. Pat. No. 5,283,784, entitled "Echo Canceller Processing Techniques and Processing" and issued Feb. 1, 1994 to Genter. An advanced hybrid suppressor, referred to herein as an AC-center attenuator, is described in copending U.S. patent application Ser. No. 09/005,149, entitled "Methods and Apparatus for Improved Echo Suppression in Communications Systems" and filed on even date herewith. Each of the above identified patents, as well as each of the above identified patent applications, is incorporated herein in its entirety by reference.

The echo suppressor 130 of FIG. 1A can also be combined with a linear echo canceler and/or a comfort noise generator to provide a more sophisticated echo suppression system. FIG. 1B depicts an exemplary system 101 including the microphone 110, the loudspeaker 120 and the echo suppressor 130 of FIG. 1A, and an acoustic echo canceler 140 and a comfort noise summing device 150. As shown, the microphone output 115 is coupled to an audio input of the acoustic echo canceler 140, and an audio output 145 of the acoustic echo canceler 140 is coupled to the audio input of the echo suppressor 130. The suppressor audio output 135 and a comfort noise signal are coupled to first and second inputs of the summing device 150, respectively, and an audio output 155 of the summing device 150 serves as the near-end audio input to the telephone (not shown). The far-end audio output 125 from the telephone is coupled to the audio input of the loudspeaker 120 and to reference inputs of the acoustic echo canceler 140 and the echo suppressor 130.

In operation, the acoustic echo canceler 140 dynamically models the acoustic path from the loudspeaker 120 to the microphone 110 and attempts to cancel, from the microphone output signal 115, any loudspeaker sound that is picked up by the microphone 110. Algorithms commonly used for modeling the acoustic echo path include the well known Least Mean Squares (LMS) algorithm and variants such as Normalized Least Mean Squares (NLMS). An exemplary Least Mean Squares based canceler is described in the above cited U.S. Pat. No. 5,475,731 to Rasmusson et al. Additionally, an advanced Normalized Least Mean Squares based canceler is described in copending U.S. patent application Ser. No. 08/852,729, entitled "An Improved Echo Canceler for use in Communications Systems" and filed May 7, 1997, which is incorporated herein in its entirety by reference.

In the system 101 of FIG. 1B, the echo suppressor 130 supplements the echo canceler 140 and provides additional echo attenuation as necessary. For example, the echo suppressor 130 can be dynamically adjusted based on a measurement of the instantaneous level of echo cancelation achieved by the acoustic echo canceler 140 to attenuate the residual echo to a predetermined goal level. Advanced methods for dynamically measuring the echo cancelation provided by an echo canceler are described, for example, in the above cited U.S. patent application Ser. No. 09/005,149 (entitled "Methods and Apparatus for Improved Echo Suppression in Communications Systems" and filed on even date herewith).

As in the system 100 of FIG. 1A, the echo suppressor 130 can be a clipping suppressor, a scaling suppressor or a hybrid suppressor. Additionally, the echo suppressor 130 can, when following the echo canceler 140, be a simple single-throw switch which selectively cuts out, or mutes, the audio output signal 135 at appropriate times (e.g., during periods in which a voice activity detector indicates that the microphone signal 115 contains no speech). In any case, the echo suppressor 130 attenuates the entire audio signal and, in addition to suppressing echo, distorts any background noise and/or near-end speech which may be present. In fact, the background noise can be suppressed to the point that the far-end user may erroneously believe that the call has been disconnected when the echo suppressor 130 is active.

Therefore, to improve the quality of communication for the far-end user, today's systems often add comfort noise to the telephone audio signal 135 when the echo suppressor 130 is active. In the system of FIG. 1B, comfort noise is added to the suppressor output signal 135 via the summing device 150. Alternately, the summing device 150 can be replaced with a switch so that either the suppressor output signal 135 or the comfort noise signal is selectively passed to the far-end user. Advanced methods for generating and utilizing comfort noise are described, for example, in U.S. patent application Ser. No. 09/005,145, entitled "Methods and Apparatus for Providing Comfort Noise in Communications Systems" and filed on even date herewith, which is incorporated herein in its entirety by reference.

While the above described systems provide sophisticated echo suppression, known methods for controlling such systems are inadequate in several respects. For example, known methods for controlling the echo suppressor 130 often result in the far-end user perceiving unacceptably distorted near-end speech. In other words, known methods of control sometimes activate the echo suppressor 130 when it should not be activated (e.g., during near-end single talk) and/or cause the echo suppressor 130 to attenuate the near-end signal more than is necessary or desirable (e.g., during periods of double talk). Additionally, certain known methods of controlling a residual echo suppressor (e.g., closing and opening a single-throw switch which follows a front-end echo canceler in dependence upon the presence or absence of near-end speech) can sometimes provide inadequate echo suppression. Consequently, there is a need for improved methods and apparatus for controlling echo suppressors.

SUMMARY OF THE INVENTION

The present invention fulfills the above-described and other needs by providing methods and apparatus for controlling an echo suppressor to provide a desired level of echo attenuation while minimizing the likelihood that the echo suppressor will introduce more attenuation, and thus more distortion, than is necessary at any given time. Advantageously, the methods and apparatus of the present invention permit construction of communications systems which provide excellent echo suppression while optimizing perceived signal quality under a variety of conditions.

In a first exemplary embodiment, an echo suppression device according to the invention includes an echo suppressor configured to attenuate a first communications signal (e.g., a near-end audio signal). More specifically, the echo suppressor attenuates the first communications signal in order to suppress an echo component of the first communications signal, wherein the echo component results from a reflection of a second communications signal (e.g., a far-end audio signal). The exemplary echo suppression device also includes a voice activity detector configured to provide an indication of whether the second communications signal includes a speech component, and the echo suppressor is deactivated when the voice activity detector indicates that the second communications signal does not include an echo-causing speech component. As a result, the echo suppressor is active (and introduces distortion on the first communications signal) only when necessary.

In a second exemplary embodiment, an echo suppression device according to the invention includes an echo suppressor configured to multiply a portion of a first communications signal by an attenuation factor in order to suppress an echo component thereof, the echo component resulting from a reflection of a second communications signal. The exemplary echo suppression device also includes a gain control processor configured to detect a prevailing condition of the communications signals and to adjust the suppressor attenuation factor accordingly. For example, the gain control processor can set the suppressor attenuation factor to one of two values in dependence upon whether the first communications signal includes a near-end speech component. As a result, the exemplary echo suppression device can provide an appropriate level of echo attenuation while introducing minimal signal distortion.

In a third exemplary embodiment, an echo suppression device according to the invention includes an echo suppressor configured to attenuate a first communications signal in order to suppress an echo component thereof, the echo component resulting from a reflection of a second communications signal. The echo suppression device also includes a gain control processor configured to detect a ratio of voice to noise in the first communications signal and to adjust a level of attenuation provided by the echo suppressor based upon the detected ratio. For example, the gain control processor can deactivate the echo suppressor when the ratio is at or below a predefined threshold. Alternatively, the gain control processor can adjust an attenuation factor of the echo suppressor to ensure that a ratio of echo to noise in an output of the echo suppression device is at or below a predefined threshold. As a result, the exemplary echo suppression device can provide an appropriate level of overall echo attenuation while introducing a minimum of signal distortion.

The above-described and other features of the present invention are explained in detail hereinafter with reference to the illustrative examples shown in the accompanying drawings. Those skilled in the art will appreciate that the described embodiments are provided for purposes of illustration and understanding and that numerous equivalent embodiments are contemplated herein.

BRIEF DESCRIPTION OF THE DRAWINGS

FIG. 1A depicts an exemplary echo suppression system in which the teachings of the present invention can be implemented.

FIG. 1B depicts an alternative exemplary echo suppression system in which the teachings of the present invention can be implemented.

DETAILED DESCRIPTION OF THE INVENTION

Figure 2:
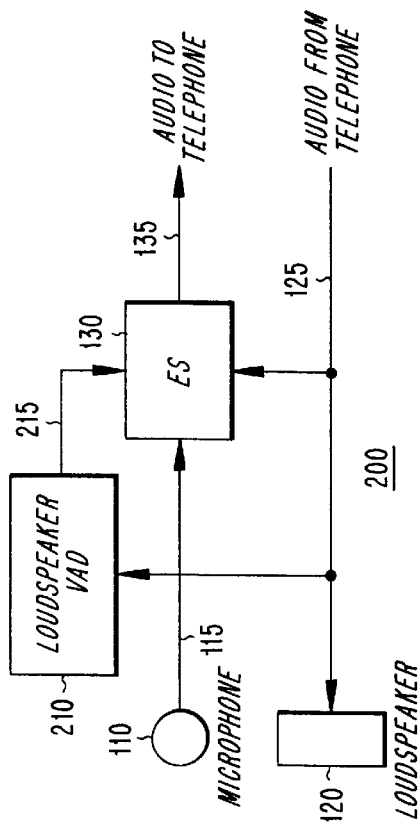
FIG. 2 depicts an exemplary echo suppression system according to the invention, the exemplary system including a voice activity detector configured to provide a control input to an acoustic echo suppressor.

FIG. 2 depicts an exemplary echo suppression system 200 constructed in accordance with a first aspect of the invention. As shown, the exemplary system 200 includes the microphone 110, the loudspeaker 120 and the echo suppressor 130 of FIGS. 1A and 1B, and a loudspeaker voice activity detector 210. The audio output 115 of the microphone 110 is coupled to the audio input of the echo suppressor 130, and the audio output 135 of the echo suppressor 130 serves as the near-end audio input to the telephone (not shown). The far-end audio output 125 from the telephone is coupled to the audio input of the loudspeaker 120 and to reference inputs of the echo suppressor 130 and the voice activity detector 210. A binary output 215 of the voice activity detector 210 is coupled to a control input of the echo suppressor 130.

Generally, operation of the system 200 of FIG. 2 is similar to that of the system 100 of FIG. 1A. In other words, the echo suppressor 130 attenuates the microphone signal 115, in dependence upon the far-end audio signal 125, so that acoustic echo from the loudspeaker 120 to the microphone 110 is not passed back to the far-end telephone user. However, in the system of FIG. 2, operation of the echo suppressor 130 is also made dependent upon the binary output 215 of the voice activity detector 215. More specifically, the echo suppressor 130 is activated only when the voice activity detector 210 indicates that the far-end signal 125 includes a speech component (e.g., when the detector output 215 is equal to binary one).

By conditioning activation of the echo suppressor 130 on the voice activity detector output 215, the system 200 of FIG. 2 is less likely to introduce undesirable distortion on the microphone signal 115 when it is not necessary to do so. In other words, since there can be no far-end echo during periods in which the far-end user is not speaking, there is no need for the echo suppressor 130 to be active during those periods. Thus, by deactivating the echo suppressor 130 when the voice activity detector 210 indicates no far-end speech, the system 200 of FIG. 2 reduces the likelihood that the echo suppressor 130 will attenuate, and thus distort, near-end speech and noise during periods when far-end echo suppression is not needed.

Note, however, that since the loudspeaker voice activity detector 210 can sometimes make mistakes, it cannot be guaranteed that the echo suppressor 130 will never be active when the far-end user is not speaking. Nonetheless, as compared to prior art systems which do not condition suppressor operation, the system 200 of FIG. 2 provides superior near-end signal quality. Further, the system of FIG. 2 provides superior protection against unnecessary attenuation by the echo suppressor 130 as compared to prior art systems which condition suppressor operation based on a microphone voice activity detector. Since the loudspeaker signal typically has a quieter background than the microphone signal (e.g., in an automobile hands-free application), the loudspeaker voice activity detector 210 is generally more reliable than is a microphone voice activity detector. In other words, it is easier to detect a lack of speech in a quiet-background loudspeaker signal than it is to detect low-level speech in a noisy-background microphone signal.

Note also that the above discussion presumes that the network equipment between the near-end and far-end users is sufficient to prevent the howling which can occur at frequencies for which the round-trip gain (i.e., the signal gain from the far-end user, across the network and back to the far-end user) is greater than unity. In other words, if the echo suppressor 130 is to be completely deactivated based on the absence of far-end speech, something else (e.g., a network echo canceler) should be used to prevent howling. Alternatively, instead of completely deactivating the echo suppressor 130 during periods of no far-end speech, the echo suppressor 130 can remain active and can be adjusted (in the case of clipping, scaling and hybrid suppressors) to provide a nominal level of attenuation which is just sufficient to prevent howling (e.g., −6 to −10 dB).

Those skilled in the art will appreciate that methods for implementing the loudspeaker voice activity detector 210 are well known. For example, European Telecommunications Standards Institute (ETSI) document GSM-06.82 describes an implementation suitable for purposes of the present invention. Such voice-activity detectors are currently used in many communications systems for purposes of noise suppression and/or discontinuous transmission (DTX). Typically, such voice activity detectors are biased toward speech. In other words, they will sometimes indicate that speech is present when it is not present, but they will rarely indicate that no speech is present when it is present. Since the loudspeaker voice activity detector 210 of the present invention has similar requirements (i.e., it is preferable to err on the side of caution and attempt to attenuate echo that does not exist than it is to allow echo that does exist to be passed back to the far-end user), the same type of voice activity detector can be used in the exemplary system 200 of FIG. 2.

As described above with respect to FIGS. 1A and 1B, the echo suppressor 130 of FIG. 2 can be a clipping suppressor, a scaling suppressor, a hybrid suppressor or, when the front-end echo canceler 140 is included, a cut-off switch. Thus, depending upon which type of suppressor is used, any one of a variety of methods for deactivating the echo suppressor 130 during periods of no far-end speech can be implemented. For example, any type of suppressor can be effectively deactivated by using a bypass switch to circumvent the suppressor entirely. Alternately, the cut-off switch suppressor can be deactivated simply by forcing the switch closed. A clipping suppressor can be deactivated, or put in a pass-through mode, by setting the size of the clipping window to zero. A scaling suppressor, on the other hand, can be put in pass-through by setting the attenuation factor to unity. Furthermore, a hybrid suppressor can be put in pass through by setting the attenuation window to zero and/or setting the attenuation factor to unity.

Note that the embodiment of FIG. 2 works especially well if the front-end echo canceler 140 of FIG. 1B is included. This results from the fact that the echo canceler 140 can usually provide sufficient echo suppression, without assistance from the echo suppressor 130, during periods when the voice activity detector 210 incorrectly indicates that no speech is present in the loudspeaker signal 125. In other words, the voice activity detector 210 is likely to make such an error only when the loudspeaker signal 125 is relatively noisy (and the far-end speech is thus somewhat masked in noise), and the far-end user is less sensitive to noise-masked echo in the first instance. Whether the echo canceler 140 is included or not, however, the system 200 of FIG. 2 provides excellent near-end signal quality.

Figure 3:
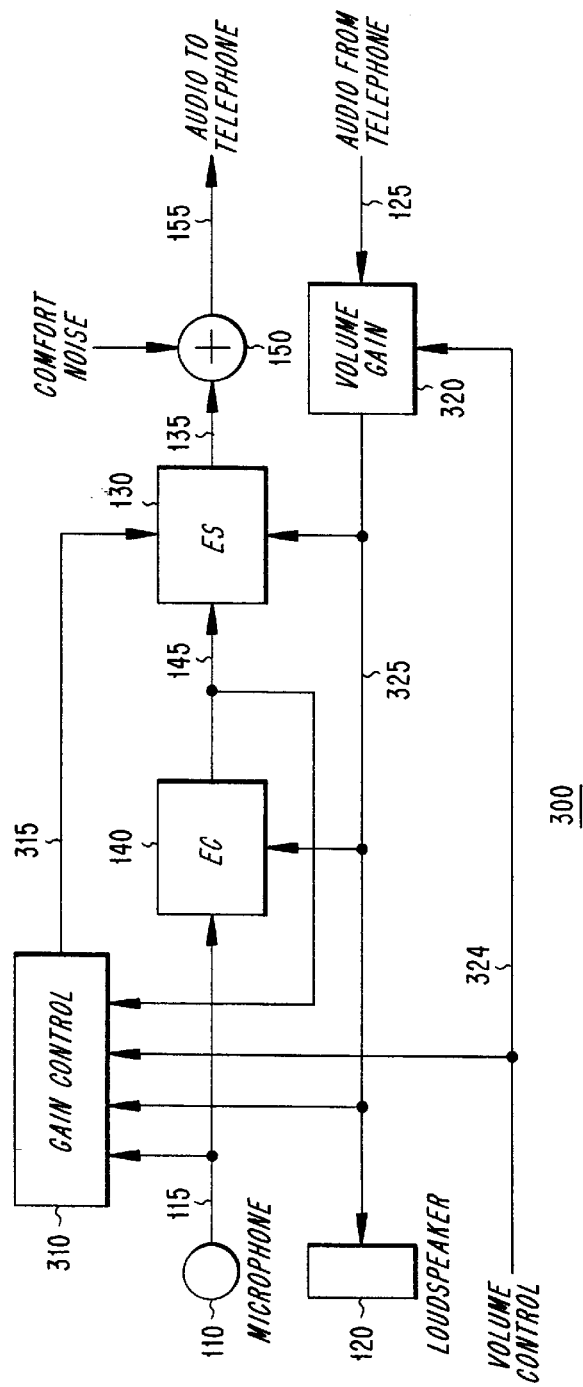
FIG. 3 depicts an alternative echo suppression system according to the invention, the alternative system including a gain control processor configured to adjust an attenuation factor of an acoustic echo suppressor.

FIG. 3 depicts an alternative echo suppression system 300 constructed in accordance with additional aspects of the invention. As shown, the exemplary system 300 includes the microphone 110, the loudspeaker 120, the echo suppressor 130, the echo canceler 140 and the summing device 150 of FIGS. 1A and 1B, and a gain control processor 310 and a volume gain block 320. The microphone output 115 is coupled to the audio input of the acoustic echo canceler 140 and to a first reference input of the gain control processor 310. The audio output 145 of the acoustic echo canceler 140 is coupled to the audio input of the echo suppressor 130 and to a second reference input of the gain control processor 310. The suppressor audio output 135 and the comfort noise signal are coupled to the first and second inputs of the summing device 150, respectively, and the audio output 155 of the summing device 150 serves as the near-end audio input to the telephone (not shown).

The far-end audio output 125 from the telephone is coupled to an audio input of the volume gain block 320, and an audio output 325 from the volume gain block 320 is coupled to the audio input of the loudspeaker 120 and to reference inputs of the echo suppressor 130 and the acoustic echo canceler 140. The audio output 325 from the volume gain block 320 is also coupled to a third reference input of the gain control processor 310, and a control output 315 of the gain control processor 310 is coupled to a control input of the echo suppressor 130. A volume control signal 324 is coupled to a fourth reference input of the gain control processor 310 and to a control input of the volume gain block 320.

Generally, operation of the system 300 of FIG. 3 is similar to that of the system 101 of FIG. 1B. In other words, the acoustic echo canceler 140 dynamically models the acoustic path from the loudspeaker 120 to the microphone 110 and attempts to cancel any loudspeaker sound picked up by the microphone 110. The echo suppressor 130 then provides additional echo attenuation as necessary, and comfort noise is optionally added via the summing device 150 to compensate for near-end noise attenuated by the echo suppressor 130. In the system 300 of FIG. 3, however, the gain control processor 310 controls the level of attenuation provided by the echo suppressor 130 in accordance with aspects of the invention.

The volume gain block 320 is included in the system 300 of FIG. 3 to better illustrate operation of the gain control processor 310. Generally, the volume gain block 320 attenuates the telephone audio signal 125, in accordance with the volume control signal 324, and passes the attenuated audio signal 325 to the loudspeaker 120. The volume control signal 324 can be adjusted, for example, by the near-end user.

According to one aspect of the invention, the echo suppressor 130 is presumed to be either a scaling suppressor or a hybrid suppressor which multiplies at least a portion of the audio signal 145 by an attenuation factor a. In such case, the gain control processor 310 utilizes the volume control signal 324, the microphone signal 115, the loudspeaker signal 125 and/or the canceler output signal 145 to provide the attenuation factor α via the control processor output signal 315.

Specifically, the gain control processor 310 utilizes the reference signals 115, 145, 324, 325 to dynamically measure a loop, or round-trip, echo gain which is in turn used to compute the suppressor attenuation factor a. The loop gain indicates the degree to which far-end speech in the telephone audio signal 125 is being attenuated as it passes through the volume control block 320, across the acoustic path from the loudspeaker 120 to the microphone 110 and through the echo canceler 140. The loop gain can thus be used to compute the amount of additional attenuation the echo suppressor 130 should provide so that the echo in the near-end audio signal 135 is attenuated to a particular goal level.

Note that the level of attenuation provided by the volume gain block 320 is known from the volume control signal 324. However, the level of attenuation provided by the acoustic path (which is referred to as the channel gain) and the level of attenuation provided by the echo canceler 140 (referred to as the canceler gain) are computed based on the microphone signal 115, the loudspeaker signal 325 and the canceler output signal 145. Advanced methods for computing the channel and canceler gains are described, for example, in the above incorporated U.S. patent application Ser. No. 09/005,149 (entitled "Methods and Apparatus for Improved Echo Suppression in Communications Systems" and filed on even date herewith). Since specific details relating to computation of the channel and canceler gains are not critical to an understanding of the present invention, however, a detailed description of such computation is omitted here for sake of brevity.

As noted above, the gain control processor 310 can, given the loop gain from the input of the volume control block 320 to the output of the echo canceler 140 (or to the output of the microphone 115 if the echo canceler 140 is not included), compute the suppressor attenuation factor a so that the echo in the near-end audio signal 155 is suppressed to a particular goal level. However, by way of contrast to prior art systems in which the goal level is fixed, the gain control processor 310 of the system 300 of FIG. 3 adjusts the goal level based on prevailing conditions so that the echo suppressor 130 introduces a minimum of distortion on the near-end audio signal 155.

In other words, whereas prior art systems typically set the goal level to a relatively stringent fixed value (e.g., to account for a single worst case condition such as far-end single talk with no near-end background noise) and thus distort the near-end signal 155 more than is necessary when the stringent goal level is not required (e.g., when the single worst case condition does not exist), the gain control processor 310 of FIG. 3 dynamically selects a preferred one of multiple possible goal levels, each one of the possible goal levels being most suitable for a particular prevailing condition. For example, during periods of far-end single talk, the far-end user is quite sensitive to echo, and the goal level should be commensurately severe (e.g., −45 dB or lower). During periods of double talk, however, the far-end user is less sensitive to echo, and the goal level can be somewhat relaxed (e.g., −25 dB or lower). Advantageously, the gain control processor 310 can detect these and other prevailing conditions and set the goal level (and thus the suppressor attenuation factor a) accordingly. As a result, the system 300 of FIG. 3 introduces no more distortion on the near-end signal 155 than is necessary at any given time.

To detect conditions of near-end single talk, far-end single talk, double talk, high near-end noise, etc., the gain control processor 310 utilizes the microphone signal 115, the loudspeaker signal 325 and/or the canceler output signal 145. For example, to detect far-end speech, the gain control processor 310 can include the loudspeaker voice activity detector 210 described above with reference to FIG. 2. Additionally, the gain control processor 310 can include a microphone voice activity detector to detect near-end speech based on the microphone signal 115 and/or the canceler output signal 145.

Those skilled in the art will appreciate that methods for implementing a crude microphone voice activity detector based only on the microphone signal 115 are well known. Additionally, advanced methods for detecting near-end speech based on the input and output signals of an echo canceler (e.g., based on the microphone signal 115 and the canceler output 145) are described by way of pseudo-code below. Since specific details relating to detection of near-end speech are not critical to an understanding of the present invention, however, such details are omitted here.

It is important to note that the above described goal level selection process is applicable when the echo suppressor 130 is active and attenuating the audio signal 145 to at least some degree (i.e., when the echo suppressor 130 is not being bypassed or put in a pass through mode as described above). Thus, the present invention is distinguishable from systems which avoid near-end signal distortion by completely deactivating the echo suppressor 130 based on the detection of near-end speech (e.g., during periods of double talk). Since such systems rely on the echo canceler 140 alone to provide sufficient echo suppression when the echo suppressor 130 is deactivated, such systems are often unable to meet the recommended goals of today's telecommunications standards (e.g., IS-55A recommends −45 dB of echo attenuation during far-end single talk and −25 dB of echo attenuation during double talk).

By way of contrast, the present invention permits the echo suppressor 130 to remain active during periods of double talk and can therefor easily meet the recommended goals at all times. Empirical studies have shown that using echo suppression goals of −56 dB and −25 dB during periods of far-end single talk and double talk, respectively, provide a good balance between the conflicting needs for maximal echo suppression and minimal near-end signal distortion. Those skilled in the art will appreciate that, although goal levels are explicitly provided for only two prevailing conditions (i.e., far-end single talk and double talk), many other prevailing conditions (e.g., high and low levels of near-end and far-end noise) are contemplated and can be accounted for by providing additional possible goal levels.

According to another aspect of the invention, the gain control processor 310 of FIG. 3 regulates the echo suppressor 130 based upon a measurement of the ratio of echo to noise in the suppressor input signal 145. Specifically, the gain control processor 310 dynamically measures the echo-to-noise ratio at the suppressor input 145 and provides the echo suppressor 130 with an appropriate control signal via the processor output signal 315.

In one exemplary embodiment, the gain control processor 310 deactivates the echo suppressor 130 when the measured echo-to-noise ratio is below a predetermined threshold. In other words, when the echo is effectively hidden in, or masked by, background noise, the echo is not perceptible to the far-end user, and the echo suppressor 130 need not introduce near-end signal distortion in an attempt to suppress the echo further. Thus, the echo suppressor 130 can be deactivated or adjusted to provide a nominal level of attenuation which is just sufficient to prevent howling.

Empirical studies have shown that an echo-to-noise ratio of −10 dB or lower provides sufficient noise masking from a far-end user perspective. However, the noise masking threshold for deactivating the echo canceler 130 can be set lower than −10 dB in practice to avoid mistakenly passing perceptible echo due to errors in computation of the echo-to-noise ratio. Empirical studies have shown that a noise masking threshold of −18 dB is effective for this purpose.

As described above, the echo suppressor 130 can be deactivated in a variety of ways. For example, any type of echo suppressor 130 can be effectively deactivated using a bypass switch, and a cut-off switch suppressor can be deactivated by forcing the cut-off switch closed. Additionally, a clipping suppressor can be deactivated by reducing the size of the clipping window to zero, and a scaling suppressor can be deactivated by setting the suppressor attenuation factor to unity. A hybrid suppressor can be deactivated by setting the clipping window to zero and/or by setting the suppressor attenuation factor to unity.

Where the echo suppressor 130 is either a scaling suppressor or a hybrid suppressor (i.e., where the echo suppressor multiplies at least a portion of the suppressor input signal by an attenuation factor α), the echo-to-noise measurement can be combined with the above described loop gain concept to provide additional benefits. For example, in one embodiment of the invention, the gain control processor 310 computes the loop gain from the input of the volume gain block 320 to the input of the echo suppressor 130 as described above and then computes the suppressor attenuation factor a needed to mask the echo in background noise (i.e., the attenuation factor a which will result in an audio output signal 155 having an echo-to-noise ratio of, for example, −18 dB). Note that, since the echo suppressor 130 attenuates the entire audio signal 145 (including echo, speech and noise), the present embodiment presumes that comfort noise is added to the suppressor output signal 135 in order to compensate for the background noise removed by the echo suppressor 130.

According to exemplary embodiments, the ratio of echo to noise in the audio input to the echo suppressor 130 is computed by measuring the total energy in the audio input and by estimating a level of noise energy in the audio input. Specifically, the noise energy estimate is subtracted from the total energy measurement, and the resulting difference (which indicates a level of echo energy) is divided by the noise energy estimate to provide the estimated echo-to-noise ratio. Those skilled in the art will appreciate that methods for measuring the energy in a signal and for estimating a noise level within a signal are well known. Additionally, advanced methods for computing a noise level estimate are described by way of pseudo-code below. Since specific details relating to noise level estimation are not critical to an understanding of the present invention, however, such details are omitted here.

Figure 4:
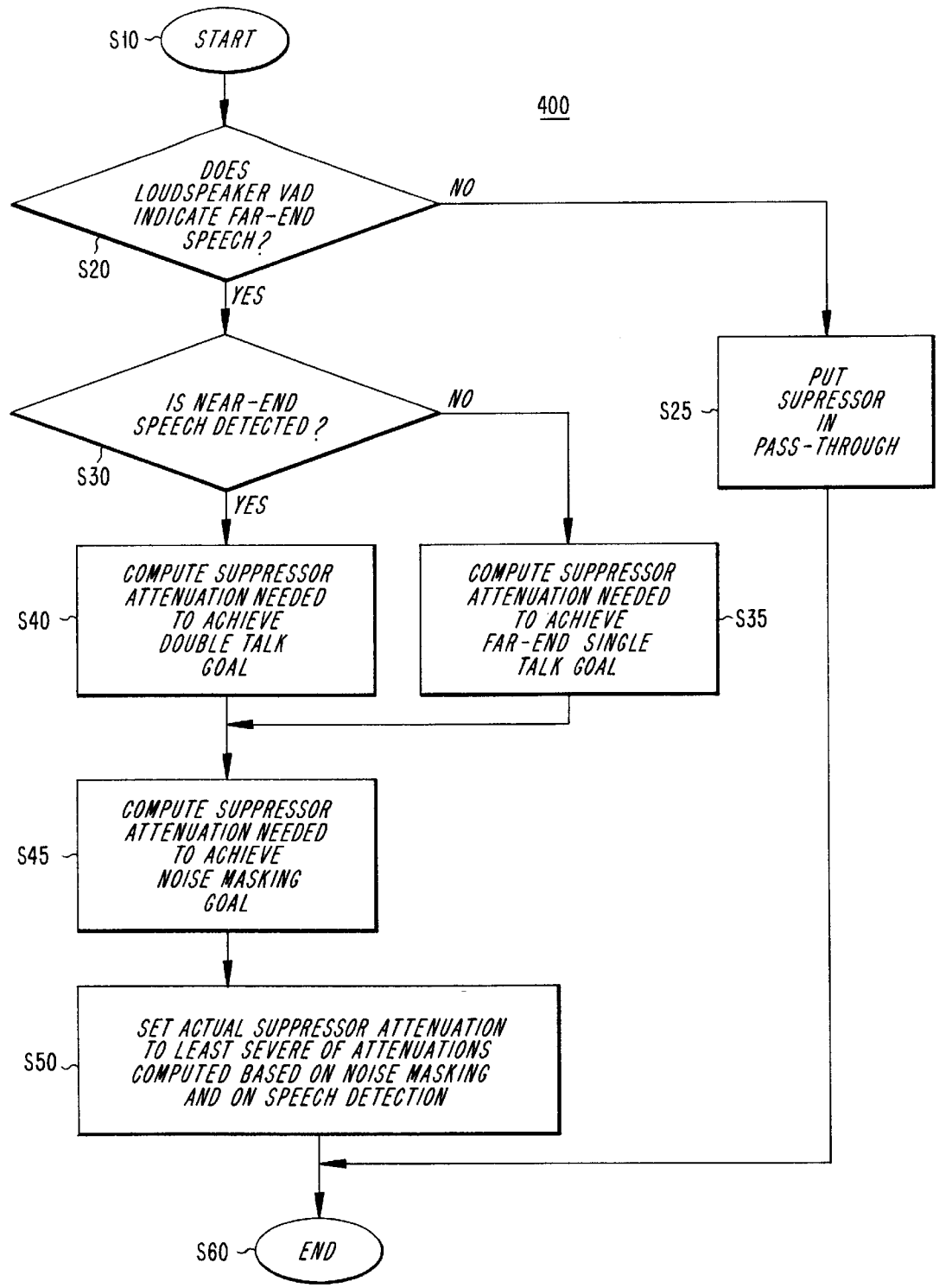
FIG. 4 depicts steps in an exemplary method of controlling an echo suppressor according to the invention.

Advantageously, all of the above described aspects of the present invention can be combined within a single echo suppression system to provide sophisticated echo suppressor control and optimal near-end signal quality. To demonstrate this point, FIG. 4 depicts an exemplary algorithm 400 in which the attenuation factor α for the echo suppressor 130 is adjusted using multiple aspects of the present invention. Since the exemplary algorithm 400 utilizes the loop gain concept, the algorithm 400 is primarily applicable to scaling suppressors and hybrid suppressors. Those skilled in the art will appreciate, however, that certain aspects of the exemplary algorithm 400 are applicable to all types of suppressors as described above.

As shown, the algorithm 400 begins at step 510 and a decision is made at step S20 as to whether the loudspeaker voice activity detector 210 indicates the presence of far-end speech. If not, then the echo suppressor 130 is put in a pass through mode and the process is completed at step S60. However, if the loudspeaker voice activity detector 210 does indicate far-end speech, then a decision is made at step S30 as to whether near-end speech has also been detected.

If near-end speech has not been detected, then an attenuation factor required to achieve a predefined far-end single talk goal is computed at step S35. However, if near-end speech has been detected, then an attenuation factor required to achieve a predefined double talk goal is computed at step S40. In either case, an attenuation factor required to achieve a predefined noise masking goal is computed at step S45. Thereafter, at step S60, the attenuation factor α is set to the least stringent of the attenuation factors computed based on noise masking (at step S45) and speech detection (at either step S40 or S35). The process is then completed at step S60.

An exemplary embodiment of the algorithm 400 of FIG. 4 is provided by way of pseudo-code below. In the pseudo-code, a scaling or hybrid echo suppressor is assumed to operate using an attenuation or gain factor echoSuppressorGain.

```
if farEndVoiceFlag == 0,
    echoSuppressorGain = 1
else,
    if nearEndVoiceFlag == 1,
        loopEchoGainGoal = -25 dB
    else,
        loopEchoGainGoal = -56 dB
    end
    echoSuppressorGain = . . .
        max(loopEchoGainGoal / loopEchoGain, . . .
            echoToNoiseGoal / echoToNoise)
end
```

Note that in the algorithm of FIG. 4, the noise masking goal is computed (at step S45) whether or not near end speech has been detected (at step S30). In practice, however, empirical studies have shown that, when the front-end echo canceler 140 is included, the attenuation factor α computed based on the typical double talk goal (e.g., -25 dB) is always greater (and thus causes less distortion) than that computed based on the typical noise masking goal (e.g., -18 dB). As a result, DSP cycles can be saved in practice (when the front-end echo canceler 140 is included) by not bothering to compute the attenuation factor α for the noise masking goal when double talk has been detected.

Also note that the algorithm 400 of FIG. 4 does not attempt to deactivate the echo suppressor 130 when the echo-to-noise ratio at the suppressor input is already at or below the noise masking goal. This results from the fact that empirical studies have shown that, for scaling and hybrid suppressors, it is better to leave the echo suppressor 130 active (with an attenuation factor α based on the noise masking goal) so that perceptible error is not mistakenly passed due to inaccurate echo and noise estimates (e.g., the estimates used to compute the echo-to-noise ratio itself).

Computer simulations have shown that an echo suppression system constructed in accordance with the teachings of the present invention (e.g., in accordance with the algorithm of FIG. 4) can significantly reduce the distortion of near-end speech and background noise typically introduced by a non-linear echo suppressor. For example, deactivating the echo suppressor 130 when the loudspeaker voice activity detector 210 indicates no far-end speech results in perfect, non-distorted near-end speech and noise under far-end single talk conditions. This is true even when there is constant noise in the loudspeaker signal.

Additionally, adjusting the echo suppression goal for an active echo suppressor based on the detection of near-end speech results in greatly improved near-end speech and noise under double talk conditions (and perfect near-end speech and noise when the combined gain of the volume control, the acoustic echo path and the linear echo canceler is -25 dB or better, which is usually the case). Adjusting the echo suppression goal for an active echo suppressor also serves to improve near-end speech and noise under near-end single talk conditions when the loudspeaker voice activity detector 210 mistakenly detects noise as speech.

Further, controlling an echo suppressor based on a measurement of echo to noise at the suppressor input improves near-end speech and noise under noisy car conditions. For example, during far-end single talk, attenuation of the near-end background noise is reduced. As a result, less comfort noise is needed to reassure the far-end user, and the character of the background noise perceived by the far-end user is better preserved. Also, during periods of double talk or near-end single talk, near-end speech and noise are improved even when both the loudspeaker voice activity detector 210 and the near-end speech detector fail. Thus, during near-end single talk with a great deal of near-end noise (e.g., road and traffic noise in an automobile hands-free application), the present invention provides three mechanisms to ensure reduced distortion of near-end speech and noise despite constant loudspeaker noise.

By way of example, another embodiment of the algorithm 400 of FIG. 4, as integrated in an actual echo suppression system, is described in the pseudo-code provided below. The pseudo-code is written to simulate an exemplary echo suppression system as implemented using a 32-bit digital signal processor. Those skilled in the art will appreciate that such code is exemplary in nature and that equivalents can be implemented using a wide variety of hardware configurations. The exemplary echo suppression system includes a modified version of the improved echo canceler described in the above referenced U.S. patent application Ser. No. 08/852,729 and an AC-center attenuator as described in the above referenced U.S. patent application Ser. No. 09/005, 149 (entitled "Methods and Apparatus for Improved Echo Suppression in Communications Systems" and filed on even date herewith).
% AEC and ANLP simulation script for MATLAB.
% Before running this script, set the following variables:
% inFile=name of input file, left=far end, right=near end.
% outFile=name of output file, left=ANLP output, right= AEC output.
% All files use the raw format of the DAT-Link.
% estnoise.m contains the function to estimate noise.

% Glossary:
% EC=Echo Canceler=linear echo suppresser
% AEC=Acoustic-Echo Canceler=loudspeaker-echo canceler
% NLP=Non-Linear Process=residual-echo suppresser= AC-center attenuator
% ANLP=Acoustic Non-Linear Process
% VAD=Voice-Activity Detector
% Maximum positive value for fractional representation.
ONE=32767/32768;
% Read file containing far-end and near-end signals.
fidin=fopen(inFile, 'r');
if fidin==−1
    error(['Error opening file' inFile])
end
[LRmatrix, wordcount]=fread(fidin, (2,inf],'int16');
fclose(fidIn);
% The number of samples in the update integration period.
FRAME_SIZE=160;
% Larger frame sizes give greater robustness to double-talk & near-end noise
% which tend to integrate towards zero.
% Larger also improves ability to detect convergence because the correlated
% update grows proportionally with frame size whereas the uncorrelated (noise)
% grows with the square-root of the frame size.
% Smaller improves reaction time to changes (echo path, single→double talk)
% and speeds up convergence.
% Smaller also improves ability to reject vowel sounds.
% 160 is used for ease of porting to a 160-samples-per-frame TDMA phone.
% The resulting 20 ms frame is nearly optimum for dividing speech into
% stationary-signal segments.
NFRAMES=floor((wordCount/2)/FRAME_SIZE); % Number of frames to process.
clear wordcount
NSAMPLES=NFRAMES*FRAME_SIZE; % Length of sample-based vectors for debug.
%
% Load the mic (uplink) and speaker (downlink) VAD outputs from separate
% files. If each file is not found, run the C executable on the near-end and
% far-end sound files, and save the VAD outputs in a file with the same
% prefix.
%
fidin=fopen([inFile '_up_vad'],'r');
if fidin==−1
    disp(['File=' inFile 'up_vad_not found—creating . . .'])
    fidout=fopen('vad_in.raw','w');
    fwrite(fidout, LRmatrix(2,:), 'int16'); % Uplink audio
    fclose(fidOut);
    !nrsim −s=f vad_in.raw junk vad_out.bit
    !rm vad_in.raw
    !rm junk.flt
    fidIn=fopen('vad_out.bit','r');
    if fidIn==−1
    error('Error opening file=vad_out.bit')
    end
    micVad=fread(fidIn, NFRAMES, 'int8');
    !rm vad_out.bit
    fclose(fidIn);
    fidout=fopen([inFile '_up_vad'],'w');
    fwrite(fidOut, micvad, 'int8');
    fclose(fidOut);
else
    micvad=fread(fidin, NFRAMES, 'int8');
    fclose(fidIn);
end
fidIn=fopen([inFile '_down_vad'],'r');
if fidIn==−1
    disp(['File=' inFile '_down_vad not found—creating . . .')
    fidOut=fopen('vad_in.raw','w');
    fwrite(fidout, LRmatrix(1,:), 'int16'); % Downlink audio
    fclose(fidOut);
    !nrsim −s=f vad_in.raw junk vad_out.bit
    !rm vad_in.raw
    !rm junk.flt
    fidIn=fopen('vad_out.bit','r');
    if fidIn==−1
    error('Error opening file=vad_out.bit')
    end
    speakervad=fread(fidIn, NFRAMES, 'int8');
    !rm vad_out.bit
    fclose(fidIn);
    fidOut=fopen([inFile '_down_vad'],'w');
    fwrite(fidOut, speakervad, 'int8');
    fclose(fidout);
else
    speakervad=fread(fidIn, NFRAMES, 'int8');
    fclose(fidIn);
end
% Scale inputs to use range of −1 to ONE.
LRmatrix=LRmatrix/32768;
% Number of bits to right shift values accumulated over a frame of samples.
FRAME_BITS=ceil(log2(FRAME_SIZE));
% Scale factor to quantize energies to 32 bits (Z8.23 format w/FRAME_SIZE=160)
ENERGY_SCALE=2^(31-FRAME_BITS);
% Number of taps in the reference delay line.
% It must be long enough that the high-delay taps are mostly uncorrelated with
% the far-end signal and only have near-end energy.
AEC_REF_TAPS=512;
% Number of taps in the FIR echo-estimation filter.
AEC_COEF_TAPS=256;
% Number of taps in the high-delay section of the update vector for measuring
% near-end energy.
AEC_NEAR_TAPS=128;
% Length of vector for capturing car noise samples.
COMFORT_NOISE_SIZE=128;
% Calculate the threshold on the update vector peak-to-baseline ratio for
% determining the maximum update gain. For noise uniform in the range of
% [−1 1], the expected peak update magnitude is g*FRAME_SIZE/3, while the
% expected RMS of the update vector for the uncorrelated taps is
% g*sqrt(FRAME_SIZE)/3, where g is the echo path gain. Therefore, the maximum
% update vector peak-to-baseline ratio is sqrt(FRAME_SIZE).
% However, voice does not have a constant envelope like noise. Because
% FRAME_SIZE is much smaller than the update vector length, a burst of speech % will sometimes be in the area of the update vector where the peak is
% measured but not in the area where baseline is measured. Therefore, real
% peak-to-baseline ratios can be extremely high (>300).
% Setting the threshold too low will cause instability due to high-gain
% updates even for low-energy far-end signals under noisy or double-talk
% conditions.
% Setting the threshold too high will cause slow adaptation due to high-gain
% updates only for high-energy far-end signals after large echo-path changes.
% This threshold was empirically determined as a compromise.
AEC_MAX_GAIN_THRESH=16;
% The peak-to-RMS for noise is independent of the frame size. This threshold
% for rejecting near-end voice/noise and far-end periodic signals (tones and
% vowels) was empirically derived.
AEC_BASELINE_THRESH=5.5;
% Pre-calculate the constant to use as a multiplier for the status gauge.
AEC_STATUS_GAUGE_SCALER=floor(32768/ . . .
    (AEC_MAX_GAIN_THRESH-AEC_BASELINE_THRESH))/32768;
% Create the gain profile for the FIR coefs. The profile roughly matches the
% expected range of the coefs in the car. This way, updates containing
% periodic components (vowels) are forced to follow the proper exponential
% decay characteristic and minimize divergence. Lower gain on the
% higher-delay taps also reduces update noise contribution to the coefs. The overall
% effect of the profile is to allow higher update gain without instability.
% Since all coefs have 16-bits of dynamic range, the higher-delay taps also
% have better quantization as a result of the profile. The profile is
% implemented by calculating the FIR 64 taps at a time with a right shift in
% between.
profile=ones(AEC_COEF_TAPS,1);
for k=2:(AEC_COEF_TAPS/64),
    profile((k*64−63):(k*64))=ones(64,1)*2^(1−k);
end
% Allocate debug vectors to speed up execution.
aecUpdateFactor=zeros(1,NFRAMES);
aecChanGainHist=zeros(1,NFRAMES);
aecSpeedHist=zeros(1,NFRAMES);
aecVoiceGainHist=zeros(1,NFRAMES);
aecVoiceGainBaseHist=zeros(1,NFRAMES);
aecNearRatioHist=zeros(1,NFRAMES);
aecNearGainHist=zeros(1,NFRAMES);
aecEchoGainHist=zeros(1,NFRAMES);
aecInNoiseHist=zeros(1,NFRAMES);
aecInEchoNoiseHist=zeros(1,NFRAMES);
aecInVoiceHist=zeros(1,NFRAMES);
aecInEchoVoiceHist=zeros(1,NFRAMES);
anlpInVoiceHist=zeros(1,NFRAMES);
anlpInNoiseHist=zeros(1,NFRAMES);
anlpDeltaHist=zeros(1, NSAMPLES);
anlpGainHist=zeros(1,NFRAMES);

| % Initialize variables | |
|---|---|
| aecRef = zeros(1,AEC_REF_TAPS); | % To use the last values: |
| aecCoef = zeros(AEC_COEF_TAPS,1); | % Comment out this |
| aecInNoise = FRAME_SIZE; | % Comment out this |
| aecInEchoNoise = aecInNoise; | % Comment out this |
| anlpInNoise = aecInNoise; | % Comment out this |
| aecChanGain = ONE; | % Comment out this |
| aecVoiceGain = ONE; | % Comment out this |
| aecVoiceGainBase = aecVoiceGain; | % Comment out this |
| aecNearGain = aecVoiceGain; | % Comment out this |
| aecEchoGain = aecVoiceGain; | % Comment out this |
| anlpComfortNoiseInOld = 0; | % Comment out this |
| anlpComfortNoiseOutOld = 0; | % Comment out this |
| anlpComfortNoise = zeros (1,COMFORT_NOISE_SIZE); | % Comment out this |
| anlpArCoef = 0.75; | % Comment out this | aecNearRatio=0; % Init for history only
aecInNoiseStateVars=[aecInNoise 0 0];
aecInEchoNoiseStateVars=[aecInEchoNoise 0 0];
anlpInNoiseStateVars=[anlpInNoise 0 0];
anlpSeed=1;
anlpArGain=1−anlpArCoef;
anlpRefEnvelope=0;
anlpOutLast=0;
anlpNearSpeechCount=0;
anlpNearSpeechFlag=0;
%disp(['aecCoef(1)=' dec2hex(aecCoef(1)*32768+(aecCoef(1)<0)*65536)])
%disp(['aecCoef(2)=' dec2hex(aecCoef(2)*32768+(aecCoef(2)<0)*65536)])
%disp(['aecInNoise=' dec2hex(aecInNoise*2^31)])
%disp(['anlpInNoise=' dec2hex(anlpInNoise*2^31)])
%disp(['aecChanGain=' dec2hex(aecChanGain*32768)])
%disp(['aecVoiceGain=' dec2hex(aecVoiceGain*32768)])
%disp(['aecVoiceGainBase=' dec2hex(aecVoiceGainBase*32768)])
%disp(['aecEchoGain=' dec2hex(aecEchoGain*32768)])
%disp(['anlpComfortNoiseInOld=' dec2hex(anlpComfortNoiseInOld*32768)])
%disp(['anlpComfortNoiseOutOld=' dec2hex(anlpComfortNoiseOutOld*32768)])
%disp(['anlpArCoef=' dec2hex(anlpArCoef*2^31)])
%disp(['anlpArGain=' dec2hex(anlpArGain*32768)])
fidout=fopen(outFile, 'w');
for frame=1:NFRAMES,
    frame % Display the frame number to indicate progress.
    %
    % AEC pre-frame section
    %
    % Since there is a gap between taps of the reference vector which are used
    % to update the FIR coefficients and those used in correlation of near-end
    % energy, the update vector need not be calculated for every tap of the
    % reference vector. Therefore, the update vector is represented by
    % sub-vectors specifically for the two purposes.
    % Clear update sub-vectors which accumulate over a frame.

| | |
|---|---|
| aecUpdate = zeros (AEC_COEF_TAPS,1); | % Used for FIR coef update |
| aecUpdateNear = zeros (AEC_NEAR_TAPS,1); | % Used for near-end measurement |

% Clear other frame accumulators
aecEchoEstEnergy=0;
% Reset block-floating-point variables.
aecShiftPending=0;
aecErrorShift=0;
% Get uplink and downlink PCM audio samples into buffers.
downlinkAudio=LRmatrix(1, (frame-1)*FRAME_SIZE+1:frame*FRAME_SIZE);
uplinkAudio=LRmatrix(2, (frame-1)*FRAME_SIZE+1:frame*FRAME_SIZE);
% Accumulate AEC near-end-input energy over a frame.
aecInEnergy=sum(uplinkaudio .^2);
% Quantize energy to 32 bits.
aecInEnergy=floor(aecInEnergy*ENERGY_SCALE)/ENERGY_SCALE;
%
% AEC sample section
%
for k=1:FRAME_SIZE,
   % Shift the far-end (loudspeaker) sample into the reference delay line and
   % calculate FIR output.
   % In the DSP, both operations are in one instruction.
   aecRef=[downlinkAudio(k) aecRef(1:AEC_REF_TAPS-1)];

% reference. Use block floating point representation, where aecErrorShift:
% is the exponent and aecUpdate/aecUpdateNear() is the mantissa.
T=uplinkAudio(k)*2^aecErrorShift;
% Quantize for S.15 format
T=floor(T*32768)/32768;
if aecShiftPending,
   ASM=-1;
   aecErrorShift=aecErrorShift-1;
   aecshiftPending=0;
else
   ASM=0;
end
% Calculate for the region used to update the FIR coefficients.
aecupdate=aecupdate+T*aecRef(1:AEC_COEF_TAPS)';
% Calculate for the region used to measure near-end energy.
aecUpdateNear=aecUpdateNear+ . . .
T*aecRef(AEC_REF_TAPS-AEC_NEAR_TAPS+1:AEC_REF_TAPS)';
% Quantize for S.15 format
% Add 2^(-17) to force the 1's complement floating point to act the same
% as 2's complement when rounding a negative number with a fraction of
% exactly 0.5.
aecupdate=round(aecupdate*32768+2^(-17))/32768;
aecUpdateNear=round(aecUpdateNear*32768 +2^(-17))/32768;

---

```
%TEST CODE START
%The following code quickly approximates the commented-out, bit-accurate code.
     aecEchoEst = aecRef(1:AEC_COEF_TAPS) * (aecCoef .* profile);
     aecEchoEst = max(min(round(aecEchoEst* 32768)/32768,ONE),-1);
%TEST CODE END
%    aecEchoEst = 0;
%    for m=(AEC_COEF_TAPS/64):-1:2,
%       aecEchoEst = aecEchoEst + aecRef(m*64-63:m*64) * aecCoef(m*64-63:m*64);
%       aecEchoEst = max(min(aecEchoEst,ONE),-1) / 2;
%       % Quantize for S.31 format
%       aecEchoEst = floor(aecEchoEst * 2^31) / 2^31;
%    end
%    aecEchoEst = aecEchoEst + aecRef(1:64) * aecCoef(1:64);
%    aecEchoEst = max(min(aecEchoEst,ONE),-1);
%    % Quantize for S.15 format
%    % Add 2^(-17) to force the 1's complement floating point to act the same
%    % as 2's complement when rounding a negative number with a fraction of
%    % exactly 0.5.
%    aecEchoEst = round(aecEchoEst * 32768 + 2^(-17))/32768;
%    aecEchoEst = max(min(aecEchoEst,ONE),-1);
```

---

% Accumulate echo-estimate energy over a frame.
   % To improve small-signal performance and to make this measurement in the
   % same way as the other energy accumulations, the full 40-bit accumulator
   % is saved between loop passes.
   aecEchoEstEnergy=aecEchoEstEnergy+aecEchoEst^2;
   % Calculate the AEC output=near-end (microphone) input–echo estimate.
   uplinkAudio(k)=max(min(uplinkAudio(k) -aecEchoEst,ONE),-1);
   % Accumulate coef update=correlation of error (uplinkAudio(k)) and aecupdate=max(min(aecupdate ,ONE),-1);
aecUpdateNear=max(min(aecUpdateNear,ONE),-1);
aecupdate=aecupdate*2^ASM;
aecUpdateNear=aecUpdateNear*2^ASM;
% Quantize for S.15 format after possible right shift.
aecupdate=floor(aecupdate*32768)/32768;
aecUpdateNear=floor(aecUpdateNear*32768)/32768;
% Find the peak square of the update vector (assume in first 128 taps).
% The goal is to get the peak absolute value, but the peak square takes
% fewer cycles in the DSP, even with the sqrt at the end of the frame.

```
aecUpdatePeak2=max(aecUpdate(1:128).^2);
% Flag indicates if update needs divided by 2 in the next
loop.
    aecShiftPending=aecUpdatePeak2>0.25; % 0.25=0.5^2
end
% Quantize energy for 32-bits.
aecEchoEstEnergy=floor(aecEchoEstEnergy*ENERGY_
SCALE)/ENERGY_SCALE;
%
% AEC post-frame section
%
aecout=uplinkAudio; % Save for output to file for debug.
% Accumulate AEC-output energy over a frame.
aecOutEnergy=sum(uplinkAudio .^2);
% Quantize energy for 32-bits.
aecOutEnergy=floor(aecOutEnergy*ENERGY_SCALE)/
ENERGY_SCALE;
% The true reference energy is different for each element of
the update
% vector. aecupdate(1) would use the energy from aecRef
(1),
% aecUpdate(2) would use the energy from aecRef(2), and
so forth. To
% reduce complexity, use a single number to represent the
reference energy.
% When the reference energy is used to measure the channel
echo gain
% for determining adaptation speed or to normalize the
update (NLMS), using
% too small of a value could cause instability. The compro-
mise solution
% implemented here is to use the maximum of the endpoints
where profile=1.
aecRefEnergy=max(sum(aecRef( 1:FRAME_SIZE ) .^2), .
. .
    sum(aecRef(64:FRAME_SIZE+63) .^2));
% Quantize for Z8.7 format
aecRefEnergy=floor(aecRefEnergy*128)/128;
% Measure the update baseline as the RMS of the high-delay
elements where
% the correlation between the error and far-end signals is
expected to be 0.
% Add 1 LSB to the result to ensure aecUpdateBase is
greater and
% aecPeakToBase is smaller after quantization. This avoids
the false
% impression of higher echo correlation.
% Adding 1 LSB after a floor operation produces the same
result as a ceiling
% operation except for the rare case when all the truncated
bits equal zero.
aecUpdateBase=sum(aecUpdateNear.^2)/AEC_NEAR_
TAPS;
% Quantize squared intermediate result for Z.31 format
aecUpdateBase=floor(aecUpdateBase*2^31)/2^31;
aecUpdateBase=sqrt(aecUpdateBase);
% Quantize for Z.15 format
aecUpdateBase=floor(aecUpdateBase*32768+1)/32768;
% Find the peak magnitude of the update vector.
aecUpdatePeak=sqrt(aecUpdatePeak2);
% Calculate the update peak-to-baseline ratio.
aecPeakToBase=aecUpdatePeak/aecUpdateBase;
% Quantize for Z11.4 format since 4 fractional bits are
sufficient.
aecPeakToBase=floor(aecPeakToBase*16)/16;
% Calculate the status gauge (range=[0,ONE]) from the
update
% peak-to-baseline ratio. The gauge, used in down-stream
processing, stays the same
% even though the peak-to-baseline ratio changes with
frame size and the
% baseline threshold could change.
% For near-end voice/noise or far-end periodic signals
(vowels), gauge <0.1
% For example, the first frame of a DTMF tone, with
frequencies of 941 Hz
% and 1209 Hz, was found to produce aecPeakToBase=3.5
and, thus,
% aecStatusGauge=0).
% For double talk, gauge <0.3.
% For far-end single talk:
% gauge=ONE when canceler is grossly unconverged,
regardless of noise.
% If the near-end is quiet, gauge=ONE until near complete
convergence.
% As the canceler converges, only residual echo higher in
energy than the
% near-end noise level causes gauge=ONE.
% Thus, near-end noise causes fewer updates, not reduced
update gain.
aecStatusGauge=(aecPeakToBase−AEC_BASELINE_
THRESH)* . . .
    AEC_STATUS_GAUGE_SCALER;
aecStatusGauge=max(min(aecStatusGauge,ONE),0);
% Quantize for Z.15 format
aecStatusGauge=floor(aecStatusGauge*32768)/32768
% Estimate the noise frame energy at the AEC input.
[confirmedNoVoiceFlag, aecInNoiseStateVars]=estnoise
(aecInEnergy,
    (micVad(frame)==0)&(aecStatusGauge==0),
aecInNoiseStateVars);
aecInNoise=aecInNoiseStateVars(1);
```

| aecInNoise | % Display for status |
|---|---|
| aecInNoiseHist(frame) = aecInNoise; | % Save for debug |

```
% Estimate the echo gain at the AEC input (channel gain).
% Update the estimate only during far-end single talk
% (speakerVad(frame)==1)&(aecStatusGauge >0.3), when
the ratio is
% accurate despite that the reference measurement includes
voice and noise
% while the AEC input measurement includes only voice
(aecInVoice>
% aecInNoise*8), and when reference energy is not signifi-
cantly affected by
% quantization (aecRefEnergy>=10/128). The instantaneous
gain measurement
% is not very accurate because of time misalignment and
spectrum variations.
% Therefore, an averaging process is used. The norm of the
echo canceler
% filter coefficients is an excellent long-term estimate of the
channel
% gain. However, it does not track a changing echo path
quickly enough.
% Also, since the channel gain estimate controls the adap-
tation speed of the
% linear echo canceler, stability is improved if the estimate
is independent
% of the linear echo canceler as much as possible. Thus, the
following
% scheme is used:
```

If the instantaneous measurement (aecChanGainTrial) is less than the
estimate (aecChanGain), pump the estimate down exponentially.
To speed adaptation, the estimate is set directly to the instantaneous
measurement if the error is greater than 50%, and the estimate is pumped
down proportionally if the error is greater than 12.5%, i.e., (aecChanGain-aecChanGainTrial)/4>aecChanGain/32 for aecChanGain-aecChanGainTrial>aecChanGain/8= aecChanGain*0.125.
If the instantaneous measurement is greater than the estimate, pump the
estimate up exponentially only if the measurement is not clearly dominated
by near-end voice (aecChanGainTrial<2). It would not work to use a
relative comparison such as (aecChanGainTrial <2*aecChanGain) because
no update would occur when the true channel gain jumps quickly.
Using a pump-up time constant that is ⅛ of the pump-down time constant
helps tolerate near-end voice in the instantaneous measurement.
It is difficult to tell the difference between near-end speech and when
channel echo gain gets worse. The pump-up time constant here
determines the tracking rate, and it was empirically determined.
aecInVoice=max(0, aecInEnergy-aecInNoise);
aecInVoiceHist(frame)=aecInVoice;
if (speakerVad(frame)==1)&(aecStatusGauge>0.3)&. . .
   (aecInVoice>aecInNoise*8)&(aecRefEnergy>=10/128),
   % Quantize aecInVoice to 4Z8.20 format for use as dividend to get the
   % desired scale for the quotient.
   aecChanGainTrial=floor(aecInVoice *2^20)/2^20/ aecRefEnergy;
   % Quantize and limit quotient to Z2.13 format
   aecChanGainTrial=min(4*ONE, floor (aecChanGainTrial*2A13)/2^13);
   % Calculate the square root of the quotient.
   aecChanGainTrial=sqrt(aecChanGainTrial);
   % Quantize root to Z1.14 format
   aecChanGainTrial=floor(aecChanGainTrial*2^14)/2^14;
   if (aecChanGainTrial<aecChanGain/2),
   aecChanGain=aecChanGainTrial;
   elseif (aecChanGain>aecChanGainTria,1),
   aecChanGain=aecChanGain-. . .
      max((aecChanGain-aecChanGainTrial)/4, aecChanGain/32);
   elseif (aecChanGainTrial<2*ONE),
   aecChanGain=min(ONE, aecChanGain+max (aecChanGain/256, 2^(-11)));
   end
   % Quantize for Z.15 format
   aecChanGain=floor(aecChanGain*32768)/32768;
   % Save for debug
   aecChanGainHist(frame)=aecChanGainTrial;
else
   aecChanGainHist(frame)=ONE;
end

| | |
|---|---|
| aecChanGain | % Display for status |
| aecSpeedHist(frame) = aecChanGain; | % Save for debug |

% Determine the update gain.
% Use NLMS to make the adaptation speed constant (independent of far-end
% signal amplitude) as long as the gain is less than or equal to ONE.
% Using the max function results in faster convergence than adding 1 to
% the denominator because the resulting gain is higher.
% Using the maximum of the AEC reference and near-end-input energies limits
% the normalizing gain when there is near-end noise and/or voice. The AEC
% output energy is not used instead of the AEC near-end-input energy because
% higher gain is not desired after convergence, and because stability is
% improved by not using another parameter based on the AEC output to control
% the AEC update gain. aecInEnergy should be less than aecRefEnergy with no
% near-end voice or noise in order to avoid microphone overload (since the
% microphone gain is set according to the loudest near-end speech level).
% The energy multiplier is set to 8 if we are sure there is far-end single
% talk with low near-end noise (aecInEnergy/16>= aecOutEnergy). Otherwise,
% it is set to 16. Thus, adaptation is faster when the car is quiet.
% A too-small energy multiplier results in less stability, causing
% overshoots in the adaptation and spikes in the echo canceler output.
% The overshoots also hinder differentiation between far-end single talk,
% with a changing echo path, and near-end speech.
% A too-large multiplier increases echo gain shortly after a perturbation.
% In the numerator, use the gauge to vary the gain according to the
% conditions. Also, use the channel echo gain as a multiplier to
% optimize adaptation speed to the channel. Without this multiplier,
% adaptation is either slower than necessary for high channel
% gain or unstable for low channel gain. Using the norm
% of the adaptive filter coefficients instead of the energy-based channel
% gain results in a more accurate and consistent estimate in the
% long term, but speed and stability would be compromised in the short term
% after an echo path change.
if (aecInEnergy/16>=aecOutEnergy),
   aecDenom=max(1, 8*max(aecRefEnergy, aecInEnergy));
   % For debug, set the factor equal to the negative gauge value.

```
    aecUpdateFactor(frame)=-aecStatusGauge;
else
    aecDenom=max(1, 16*max(aecRefEnergy,
aecInEnergy));
    % For debug, set the factor equal to the gauge value.
    aecUpdateFactor(frame)=aecStatusGauge;
end
% Quantize for Z12.3 format
aecDenom=floor(8*aecDenom)/8;
aecNumer=aecChanGain*aecStatusGauge;
% Quantize for 22Z.18 format
aecNumer=floor(aecNumer*2^18)/2^18;
aecUpdateGain=min(aecNumer/aecDenom, ONE);
% Quantize for Z.15 format
aecUpdateGain=floor(aecUpdateGain*32768)/32768;
% Add the update vector to the coefficient vector using the
adaptive gain.
% aeccoef is multiplied by profile before use as FIR coef-
ficients.
aeccoef=aeccoef+(aecUpdate* 2A(-aecErrorShift)
*aecUpdateGain);
% Quantize for S.15 format
% Add 2^(-17) to force the 1's complement floating point to
act the same
% as 2's complement when rounding a negative number
with a fraction of
% exactly 0.5.
aeccoef=round(aeccoef*32768+2^(-17))/32768;
aeccoef=max(min(aecCoef,ONE),-1);
% The noise suppresser would go here and process uplinkau-
dio.
% By using aecUpdate and aecUpdateNear only within one
subroutine, they can
% be in temporary memory, available for overlay.
% ANLP pre-frame section
%
% Accumulate energy at the ANLP input, which is con-
nected through the noise
% suppresser to the AEC output.
anlpInEnergy=sum(uplinkAudio .^2);
% Quantize energy to 32 bits.
anlpInEnergy=floor(anlpInEnergy*ENERGY_SCALE)/
ENERGY_SCALE;
% Estimate the noise frame energy at the ANLP input.
% Use speakervad since the echo estimate comes from the
loudspeaker signal.
[confirmedNoVoiceFlag, anlpInNoiseStateVars]=estnoise
(anlpInEnergy, . . .
    (micVad(frame)==0)&(aecStatusGauge==0),
anlpInNoiseStateVars);
anlpInNoise=anlpInNoiseStateVars(1);
anlpInNoiseHist(frame)=anlpInNoise; % Save for debug
% Calculate the comfort noise when no voice is confirmed.
if confirmedNoVoiceFlag,
    anlpComfortNoise=uplinkAudio(1:COMFORT_NOISE
SIZE);
    % Use the NLMS algorithm to estimate anlpArCoef in the
first-order
    % ARMA noise model of the form:
    %  (1-anlpArCoef)*(1+0.8125*Z^-1)/(1-
anlpArCoef*Z^-1).
    % This ARMA model will be used to filter white noise to
get noise that
    % sounds like the car noise.
    % The NLMS algorithm tries to minimize the following
expression:
    % error=uplinkAudio*(1-anlpArCoef*Z^1)/(1+
0.8125*Z^-1).
    % The correlation between error and uplinkAudio*Z^-1
is the update
    % to the coefficient estimate.
    % anlpInEnergy is used to normalize the update gain to
provide an
    % adaptation rate independent of level. Calculate the
non-zero
    % denominator outside the loop to save MIPS.
    anlpDenom=4*max(1/128, floor(anlpInEnergy*128)/
128);
    error=0;
    for i=2:FRAME_SIZE,
    error=-0.8125*error;
    % Quantize for 5S4.31 format (maximum of
        10*uplinkAudio)
    error=floor(error*2A31)/2^31;
    error=error+uplinkAudio(i-1:i)*[-anlpArCoef; 1);
    quotient=uplinkAudio(i-1:i-1)*floor(error*2A12)/2^12/
        anlpDenom;
    quotient=max(min(quotient,ONE),-1);
    % Quantize for S.15 format
    quotient=floor(quotient*32768)/32768;
    anlpArCoef=anlpArCoef+quotient;
    anlpArCoef=max(min(anlpArCoef,ONE),-1);
    end
    anlpArGain=1-anlpArCoef;
    % Plot the frequency response of the comfort noise for
debug.

%   plot((0:8191)/8192*4000, . . .
%     20*log10(abs(freqz(anlpArGain*[1 0.8125],[1 -anlpArCoef],8192))))
%   axis([0 4000 -40 10])
%   pause(1)
    end % Estimate the noise frame energy of the echo at the AEC
input.
    % Use speakervad since the echo estimate comes from the
loudspeaker signal.
    [confirmedNoVoiceFlag, aecInEchoNoiseStateVars]=
estnoise(. . .
        aecEchoEstEnergy, (speakerVad(frame)==0)&
(aecStatusGauge==0),
        aecInEchoNoiseStateVars);
    aecInEchoNoise=aecInEchoNoiseStateVars(1);
```

| | |
|---|---|
| aecInEchoNoiseHist(frame) = aecInEchoNoise; | % Save for debug |
| test1Hist(frame) = aecInEchoNoiseStateVars(2); | % Save for debug |
| test2Hist(frame) = aecInEchoNoiseStateVars(3); | % Save for debug |
| aecInEchoNoiseStateVars | % Display for status |

```
    % Estimate the voice energy estimates. Don't let them go
below zero.
    aecInEchoVoice=max(0, aecEchoEstEnergy-
aecInEchoNoise);
    aecInEchoVoiceHist(frame)=aecInEchoVoice;
    aecNearVoice=max(0, aecInVoice-aecInEchoVoice);
    anlpInVoice=max(0, anlpInEnergy-anlpInNoise);
    anlpInVoiceHist(frame)=anlpInVoice;
    % Leak upward the linear-echo-canceler baseline echo-
gain estimate.
    % It is used for comparison to the instantaneous echo gain
to detect
```

% near-end speech and for the ANLP gains during near-end speech.
% It leaks upward fast enough to track when the instantaneous
% echo gain gets worse. The leakage was empirically determined as a
% compromise between fast tracking to avoid false detection of near-end
% speech during far-end single talk with a changed echo path and minimizing
% distortion of near-end voice/noise during far-end voice/noise.
% When far-end single talk starts after the echo path has changed,
% aecNearGain can go down, go up somewhat, and then go way down. If
% aecNearGain goes up sufficiently above aecvoiceGainBase, near-end speech
% will be detected. If this happens, the leakage on aecVoice-GainBase can be
% increased to prevent this. A leakage constant of 5/4096 was empirically
% found to provide sufficient tracking speed. However, increased leakage
% reduces detection of near-end speech during double talk.
aecVoiceGainBase=min(aecvoiceGainBase+1/8192, ONE);
% Measure the linear-echo-canceler voice gain, excluding the channel.
% Including the channel gain would make near speech detection unreliable.
% Compute the root of the ratio of voice, energy at the output and input of
% the linear echo canceler.
% This raw measurement is not conditional as to whether the voice comes from
% the near end, far end, or both.
% The output of the linear echo canceler is taken at the ANLP input because
% the signal has passed through the noise suppresser, making measurements
% more accurate. Measurement by means of energy includes the loudspeaker
% distortion in the echo, which cross correlation does not. Also, comparing
% energies at the input and output of the echo canceler avoids
% time-alignment issues that arise when comparing the echo-canceler output to the
% reference (due to the delay of the channel).
% Measure gain only when not corrupted by quantization (aecInVoice>8/2^7),
% when voice is present (aecInVoice>aecInNoise*8),
% and when residual echo is measurable (anlpInVoice>anlpInNoise/2).
% The accuracy of the measurement is not reduced by periodic components
% in the far-end signal.
if (aecInVoice>max(8/2^7, aecInNoise*8))& . . .
  (anlpInVoice>anlpInNoise/2),
  aecVoiceGain=min(ONE, sqrt(anlpInvoice/(floor(aecInVoice*2^7)/2^7)));
  % Quantize for Z.15 format
  aecVoiceGain=floor(aecVoiceGain*32768)/32768;
  % Measure the ratio of near-end voice to total voice.
  % This produces fewer false indications of near-end voice due to a
  % changing echo path with far-end single talk because it only relies on
% the energy of the echo estimate, not how well the echo is canceled at
% the output. However, like aecVoiceGain, false indications of near-end
% voice are likely when the canceler is grossly untrained.
% The usual ratio would include a square root since the voice measurements
% are in energy units. However, greater differentiation is achieved
% between near-end voice and poor canceler training by using the energy
% ratio directly. This also saves MIPS.
  aecNearRatio=min(ONE, aecNearVoice/(floor(aecInVoice*2^7)/2^7));
  % Quantize for Z.15 format
  aecNearRatio=floor(aecNearRatio*32768)/32768;
% Measure the linear-echo-canceler baseline echo-gain estimate during
% far-end speech. Measure whenever far-end single talk could exist
% (aecStatusGauge>0.1) to make sure the parameter tracks the true echo
% gain (not noise). Otherwise, echo may be heard. Update the
% baseline echo-gain estimate when the voice gain is lower than the
% baseline estimate because this indicates a high probability of far-end
% single talk. By using leakage and not letting the baseline track the
% voice gain when it is higher than the baseline, the baseline is very
% robust against noise and near-end speech.
if (aecStatusGauge>0.1),
  aecVoiceGainBase=min(aecVoiceGainBase, aecVoiceGain);
end
% Measure the linear-echo-canceler voice gain during near-end
% speech, and reset during far-end single talk (take minimum with voice
% gain). This will be used for comparison against the voice gain
% baseline to detect double talk. The only indicators available that
% near-end speech may be occuring are that the echo canceler gauge is low
% (aecStatusGauge<0.3) and that the echo canceler output contains
% sufficient energy that the voice is likely not just residual echo
% (anlpInVoice>anlpInNoise*8). Remember that the gauge could be low due
% to periodic components in the far-end speech. Therefore, extra means
% are necessary to differentiate between when voice gain gets
% suddenly worse due to a change in the echo path or loudspeaker
% distortion and when there is near-end speech. When voice gain
% gets suddenly worse during far-end single talk, the duration tends to be
% rather short. Therefore, filtering the increases in this parameter
% usually rejects far-end single-talk incidents. The filter time constant % is a compromise between far-end single-talk rejection and double-talk
    % recognition speed, and it was empirically determined.
    aecNearGainLast=aecNearGain;
    aecNearGain=min(aecNearGain, aecVoiceGain);
    if (aecStatusGauge<0.3)&(anlpInVoice>anlpInNoise*8),
        aecNearGain=aecNearGain+(aecVoiceGain-aecNearGain)/8;
    % Quantize for Z.15 format
    aecNearGain=floor(aecNearGain*32768)/32768;
    end
% Use any of three detection methods for near-end speech. Each
% method is more sensitive to near-end speech under certain conditions.
% All detection occurs only when the total voice is sufficiently greater
% than an absolute level or the noise floor to reject conditions where
% only noise is present.
%
% Method 1.
% (aecInEchoVoice<aecInVoice/4) is equivalent to (aecNearRatio>=0.75)
% but the former is less sensitive to quantization. Spikes on
% aecNearRatio are common for low levels of far-end single talk.
% Therefore, the threshold must be high to avoid false detection. The
% only qualifiers needed for this detection method is that the status
% gauge=0 and the voice gain baseline be below 0.4625= 15155/32768.
% The latter threshold is an empirical compromise between avoiding false
% detection when the canceler is grossly untrained and detecting double
% talk as soon as possible after the canceler starts training.
%
% Method 2.
% (aecInVoice>32/2^7&anlpInVoice>anlpInNoise*8) rejects low-level
% voice. By doing so, the detection can be more sensitive to lower ratios
% of near-end voice to total voice. Again, accepting conditions only when
% the status gauge=0 helps reject far-end single talk. The sensitivity
% to near-end speech is optimized by varying the threshold with
% aecVoiceGainBase. The scale factor and offset is an empirical
% compromise between avoiding false detection when the canceler is grossly
% untrained and being as sensitive as possible to near-end speech after
% the canceler starts training.
%
% Method 3.
% Comparing aecNearGain with aecVoiceGainBase detects near-end speech when
% echo suppression gets suddenly and consistently worse. This is because
% aecVoiceGainBase does not react to sudden changes, and aecNearGain uses
% a filter to ensure consistency in the detection. Because of the filter
% used for computing aecNearGain, conditions are more relaxed, which
% allows greater sensitivity to near-end speech. Such conditions include
% having the status gauge<0.3 rather than=0, and having no increased
% minimum absolute level for the voice. When far-end single talk starts
% after the echo path has changed, aecNearGain can fall but still stay
% above aecVoiceGainBase for a short time. To avoid audible echo in this
% case, near-end speech is only detected when aecNearGain is greater than
% its last value.
    if ((aecStatusGauge==0)&(aecInEchoVoice<aecInVoice/4)&...
        (aecVoiceGainBase<15155/32768))|...
        ((aecStatusGauge==0)&(aecInVoice>32/2^7)&...
        (anlpInVoice>anlpInNoise*8)&...
        (aecNearRatio-aecVoiceGainBase*1.5>=9830/32768))|...
        ((aecNearGain-aecvoiceGainBase>=6554/32768)&...
        (aecNearGain>aecNearGainLast)),
    % Near-end speech has been detected.
    % If this frame begins a new period of near-end speech (the hang time
    % has expired and the last frame containing voice was only echo),
    % then set the linear-echo-canceler echo gain equal to the baseline
    % echo-gain estimate. This is done only at the beginning of a near-end
    % speech period so that the residual-echo suppresser has consistent
    % attenuation during the near-end speech rather than increasing
    % distortion as the baseline leaks upward while getting no updates.
    if (anlpNearSpeechCount==0)&(anlpNearSpeechFlag==0),
        aecEchoGain=aecVoiceGainBase;
    end
    % Set the flag indicating that the last frame with voice contained
    % near-end speech. It will remain set during frames where voice is not
    % detected.
    anlpNearSpeechFlag=1;
    % Restart the near-end-speech hang-time counter. When non-zero, it will
    % override anlpNearSpeechFlag to minimize distortion by the
    % residual-echo suppresser of near-end speech during double talk or when the
    % voice energy is too low to be detected.
    % If this counter were to start only when far-end single talk was
    % detected, there would be less cut-out of near-end speech during double
    % talk. However, the far-end person would hear echo every time he/she % started to speak after the near-end person spoke, even after a long
% pause.
% When there is a quick transition from near-end speech to far-end
% single talk (such as when the near-end person talks in the middle of
% the far-end person's speech), the hang time will cause a short period
% where the far-end person hears echo (at −25 dB). This artifact is
% worthwhile because of the significant reduction in cut-out during
% double-talk gained by the hang time.
  anlpNearSpeechCount=25; % 25*20 ms=500 ms hang-time.
  end
end
% If the echo-estimate voice energy is at least 15/16 the near-end voice
% energy, assume that this frame contains far-end echo speech only, and
% clear the near-end speech flag. If the near-end-speech hang-time counter
% has already expired, the residual-echo suppresser will immediately go to
% far-end single-talk mode. Otherwise, the residual-echo suppresser will go
% to far-end single-talk mode when the near-end-speech hang-time counter
% expires. Note that near-end speech could be detected again while the
% counter is in progress, and then the residual-echo suppresser will stay in
% near-end speech mode once the counter expires.
% This detection scheme compares 32-bit numbers and does not use any
% qualifiers based on the energy levels, the status gauge, or measurements
% from previous frames (besides the noise estimates). Therefore, the scheme
% is rather sensitive yet robust. Were this scheme to fail to detect
% far-end speech, the far-end person would hear echo when he/she started to
% speak after the near-end person spoke, even after a long pause.
if (aecInEchoVoice>(aecInVoice−aecInVoice/16)),
  anlpNearSpeechFlag=0;
end
% If the near-end-speech hang-time counter has expired, and the last frame
% containing voice was only echo, then set the linear-echo-canceler echo
% gain equal to the last-measured linear-echo-canceler voice gain. This
% assumes that no near-end speech is present, so the residual-echo
% suppresser will attempt to suppress all of the voice. This test is after
% that which clears anlpNearSpeechFlag so that aecEchoGain will reflect the
% decision immediately.
if (anlpNearSpeechCount==0)&(anlpNearSpeechFlag==0),
  aecEchoGain=aecVoiceGain;
end

| | |
|---|---|
| aecVoiceGainHist(frame) = aecVoiceGain; | % Save for debug |
| aecVoiceGainBase | % Echo for status |
| aecVoiceGainBaseHist(frame) = aecVoiceGainBase; | % Save for debug |
| aecEchoGain | % Echo for status |
| aecEchoGainHist(frame) = aecEchoGain; | % Save for debug |
| aecNearRatioHist(frame) = aecNearRatio; | % Save for debug |
| aecNearGainHist(frame) = aecNearGain; | % Save for debug |
| anlpNearSpeechCount | % Echo for status |
| anlpNearSpeechFlag | % Echo for status |

% Calculate the loop echo gain up to the ANLP. The ANLP will attenuate as
% needed to meet the total loop echo suppression goal for the system.
% ? is through the volume control.
% aecChanGain is from the loudspeaker to the microphone—the channel.
% aecEchoGain is from the input to the output of the linear echo canceler.
aecLoopEchoGain=aecChanGain*aecEchoGain; % Insert volume gain here.
% Quantize for Z.15 format
aecLoopEchoGain=floor(aecLoopEchoGain*32768)/32768
% Set the ANLP window size to capture the expected residual echo, but no
% more. This minimizes distortion on near-end voice and noise. The ANLP
% window size shrinks as the AEC improves its echo gain, so use aecChanGain
% and aecEchoGain to control the window size. The volume-control gain is
% not used because the envelope-detector input for the ANLP comes after the
% volume control. The echo gain estimates measure in an RMS sense, but the
% ANLP needs to suppress the entire residual echo including peaks. Thus,
% use a peak-to-RMS factor multiplier (=3). The dynamic range of
% anlpWindowGain is two because, when the linear echo canceler is grossly
% untrained, anlpWindowGain needs to be at least two to capture the echo
% within the window.
anlpWindowGain=min(2*ONE, 3*aecChanGain*aecEchoGain);
% Quantize for Z1.14 format
anlpWindowGain=floor(anlpWindowGain*16384)/16384;
% If the VAD indicates that there only noise on the loudspeaker, then put
% the ANLP in a pass-through mode (gain=ONE). The VAD allows high-quality
% near-end single talk because there is no distortion of the near-end speech
% or noise. The VAD will often say that there is voice when there is only
% noise, so other means are necessary to minimize distortion of the near-end
% speech or noise in this case. Also, the VAD will infrequently say that
% there is only noise when there is a low level of voice. The problem is
% somewhat proportional to the noise level on the loudspeaker. However, % having the linear echo canceler in the loop provides enough echo
% suppression to make the echo inaudible in these cases.
if speakervad(frame)==0, % Near-end single-talk condition.
    anlpEchoGain=ONE;
% Since speakervad=1, the loudspeaker most likely has speech, but not
% necessarily. If near-end speech is detected, assume double talk. In this
% case, set the total loop echo suppression goal to −25 dB (1843/32768), and
% set the ANLP gain to the needed echo suppression not provided in the rest
% of the loop. The ANLP gain is higher (the suppression is lower) and
% distortion is reduced as the customer turns down the volume from full
% scale. When the linear echo canceler is trained, the ANLP gain is
% typically higher than −10 dB in this mode, so noise masking does not
% improve the sound quality. The far-end user will hear some echo during
% double talk, but this artifact is preferable to cut-out or high distortion
% of the near-end voice.
elseif (anlpNearSpeechCount>0)|(anlpNearSpeechFlag==1), % Double-talk
    anlpEchoGain=1843/32768/aecLoopEchoGain;
% Since speakervad=1 and near-end speech is not detected, assume there is
% far-end single talk. The total loop echo suppression goal is −56 dB
% (52/32768) so that echo is almost inaudible when both ends have quiet
% backgrounds. As in double-talk mode, the ANLP gain is set to the needed
% echo suppression not provided in the rest of the loop, and the ANLP gain
% is higher and distortion is reduced as the customer turns down the volume
% from full scale and as the linear echo canceler trains. However, the
% gain needed to attenuate the echo to inaudibility below the noise floor
% may be higher, so the higher of the two gains is used for the ANLP to
% minimize distortion. Without the comfort noise, attenuating both the
% echo and the noise by the same factor would not change the signal-to-noise
% ratio; so noise masking would not work. The comfort noise makes it such
% that the noise at the input and output of the ANLP are the same level.
% Therefore, the ANLP can attenuate the echo to the threshold of audibility
% below the noise floor, without distorting more than necessary. The square
% root is taken of the ratio of noise to voice because these variables are
% in units of energy. Multiplying the desired echo-to-noise ration by the
% actual noise-to-echo ratio will factor out the noise. What is left the
% desired-to-actual echo ratio, which is the gain needed to mask the echo.
else % Far-end single-talk condition.
    ECHO_TO_NOISE_GOAL = 1/8;  % −18 dB if (anlpInVoice>anlpInNoise),
        anlpEchoGain=max(52/32768/aecLpopEchoGain,
            ECHO_TO_NOISE_GOAL*sqrt(anlpInNoise/
            anlpInVoice));
    else
        % Under noisy conditions, the gain doesn't exceed
            ECHO_TO_NOISE_GOAL,
        % even though theoretically it could for low-energy voice, because the
        % noise estimate is too large as the noise level falls quickly (car
        % slows down). This causes echo to be heard when the ANLP echo gain is
        % too high.
        anlpEchoGain=max(52/32768/aecLoopEchoGain,
            ECHO_TO_NOISE_GOAL);
    end
end
anlpEchoGain=min(ONE, anlpEchoGain);
% Quantize for Z.15 format
anlpEchoGain=floor(anlpEchoGain*32768)/32768
anlpGainHist(frame)=anlpEchoGain; % Save for debug
% Decrement the near-speech hang counter, if need be, so that it works
% independently of the loudspeaker VAD.
anlpNearSpeechCount=max(0, anlpNearSpeechCount−1);
%
% ANLP sample section
%
% If the ANLP echo gain is ONE, the ANLP is inactive— skip to save MIPS.
if (anlpEchoGain==ONE),
    % Keep the envelope detector running.
    for k=1:FRAME_SIZE,
        anlpRef=aecRef(FRAME_SIZE−k+1);
        anlpRefEnvelope=max(abs(anlpRef), 255/
            256*anlpRefEnvelope);
        anlpRefEnvelope=floor(anlpRefEnvelope*2^31)/2^31;
    end
    % Update the variable used by the AC-center attenuator to be the same as
    % what would result from processing the whole frame.
    anlpOutLast=uplinkAudio(FRAME_SIZE);
else
    for k=1:FRAME_SIZE,
        % ANLP far-end ref=AEC ref. Using aecEchoEst instead or in addition
        % gives no better results because aecEchoEst is rather unrelated to the
        % residual echo. The AEC ref works equally well since
        % it precedes the earliest echo contained in anlpIn. The long time
        % constant in the peak detector is a key to this ANLP, and it makes
        % close delay matching of anlpRef to the residual echo unnecessary.
        % The offset into the AEC ref delay line can be changed to compensate % for fixed delays in the echo path due to upsampling, downsampling,
% buffers, and/or minimum channel delay.
anlpRef=aecRef(FRAME_SIZE-k+1);
% Envelope detect (peak detect) anlpRef signal.
% The exponential decay of the peak detector models the decay of the
% reverberation in the car. The time constant is set to handle the most
% slowly-decaying reverberation condition expected.
% A pole less than 255/256 results in echo getting through.
% A pole greater than 255/256 results in excess distortion to near-end.
anlpRefEnvelope=max(abs(anlpRef), 255/256*anlpRefEnvelope);
% anlpRefEnvelope should be 32 bits for storage.
% anlpRefEnvelope rounded to 16 bits would not decay lower than
% anlpRefEnvelope truncated to 16 bits would decay 1 bit per
% sample when below 256/2^15, and this is too fast (resulting in echo
% let through).
% Quantize for Z.31 format
anlpRefEnvelope=floor(anlpRefEnvelope*2^31)/2^31;
% ANLP's Delta value is gain controlled by the AEC and limited to ONE.
anlpDelta=min(ONE,
anlpWindowGain*floor(anlpRefEnvelope*32768)/32768);
% Quantize for Z.15 format
anlpDelta=floor(anlpDelta*32768)/32768;
anlpDeltaHist((frame-1)*FRAME_SIZE+k)=anlpDelta;
% Save for debug
% Execute AC-center attenuator.
%
% The ANLP input is connected to AEC output via the noise suppresser.
anlpin=uplinkAudio(k);
% If the input is below the window,
if (anlpOutLast-anlpin)>=anlpDelta,
    % Use all of signal outside window and attenuate signal within window.
    anlpOutLast=anlpIn+anlpDelta-. . .
        anlpEchoGain*anlpDelta;
% Else if the input is above the window,
elseif (anlpIn anlpOutLast)>=anlpDelta,
    % Use all of signal outside window and attenuate signal within window.
    anlpOutLast=anlpIn anlpDelta+. . .
        anlpEchoGain*anlpDelta;
% Else the input is inside the window.
else,
    % Attenuate the signal.
    anlpOutLast=anlpEchoGain*(anlpIn anlpOutLast)+anlpOutLast;
end
% Quantize for S.15 format
anlpOutLast=floor(anlpOutLast*32768)/32768; % Save for next time.
%
% Add comfort noise such that the ANLP output noise has the same level
% and a similar spectrum as the car noise input to the ANLP.
%
% Use random samples from a frame of captured noise from the car.
% This produces white noise at the same power as the car noise even if
% the captured audio from the car accidentally contains voice.
anlpSeed=rem(48271*anlpseed, 2147483647);
anlpComfortNoiseIn=anlpComfortNoise(+1+. . . rem(anlpSeed,COMFORT_NOISE_SIZE));
% Filter the white noise using the ARMA model discussed above.
% The following is equivalent, assuming anlpArGain= 1-anlpArCoef.
%                       anlpComfortNoiseOut= anlpArCoef*anlpComfortNoiseOutOld+. . .
%      anlpArGain*(anlpComfortNoiseIn+ 0.8125*anlpComfortNoiseInOld);
ma=anlpComfortNoiseIn+ 0.8125*anlpComfortNoiseInOld; % Moving Average
madiff=anlpComfortNoiseOutOld-ma;
% Quantize for S1.15 format
% Rounding is necessary to avoid a bias on the comfort noise.
% Add 2^(-17) to force the 1's complement floating point to act the same
% as 2's complement when rounding a negative number with a fraction of
% exactly 0.5.
maDiff=round(maDiff*32768+2^(-17))/32768;
anlpComfortNoiseout=ma+anlpArCoef*maDiff;
% Quantize for S.15 format
% Rounding is necessary to avoid a bias on the comfort noise.
anlpComfortNoiseOut=round (anlpComfortNoiseOut*32768+2^(-17))/32768;
anlpComfortNoiseOut=max(-1, min(ONE, anlpComfortNoiseOut));
% Delay varables for next loop.
anlpComfortNoiseInold=anlpComfortNoiseIn;
anlpComfortNoiseoutold=anlpComfortNoiseOut;
% Limit the comfort noise to the window size.
anlpComfortNoiseOut=min(anlpDelta, ... max(-anlpDelta, anlpComfortNoiseOut));
% Scale the comfort noise so that the ANLP output noise equals the ANLP
% input noise in level.
anlpComfortNoiseOut=anlpComfortNoiseOut*(ONE-anlpEchoGain);
% Quantize for S.15 format.
anlpComfortNoiseOut=floor (anlpComfortNoiseOut*32768)/32768;
% Add comfort noise to ANLP output signal.
uplinkAudio(k)=max(-1, min(ONE, anlpOutLast+ anlpComfortNoiseOut));
end
end
% Save to the file outputs collected over a frame in integer format.
fwrite(fidout, [uplinkAudio; aecout]*32768, 'int16');
%disp(['aecInEnergy=' dec2hex(aecInEnergy*ENERGY_SCALE)])

```
%disp(['aecErrorShift='dec2hex(aecErrorShift+
(aecErrorShift<0)*65536)])
%disp(['aecUpdate(1)='dec2hex(aecUpdate(1)*32768+
(aecUpdate(1)<0)*65536)])
%disp(['aecUpdate(2)='dec2hex(aecUpdate(2)*32768+
(aecUpdate(2)<0)*65536)])
%disp(['aecUpdateNear(1)='. . .
% dec2hex(aecUpdateNear(1)*32768+(aecUpdateNear(1)
<0)*65536)])
%disp(['aecUpdateNear(2)='. . .
% dec2hex(aecupdateNear(2)*32768+(aecupdateNear(2)
<0)*65536)])
%disp(['aecUpdatePeak2='dec2hex
(aecUpdatePeak2*2^31)])
%disp(['aecOutEnergy='dec2hex
(aecOutEnergy*ENERGY_SCALE)])
%disp(['aecRefEnergy='dec2hex(aecRefEnergy*128)])
%disp(['anlpInEnergy='dec2hex
(anlpInEnergy*ENERGY_SCALE)])
%disp(['aecUpdateBase='dec2hex
(aecUpdateBase*32768)])
%disp(['aecUpdatePeak='dec2hex
(aecUpdatePeak*32768)])
%disp(['aecPeakToBase='dec2hex(aecPeakToBase*16)])
%disp(['aecStatusGauge='dec2hex
(aecStatusGauge*32768)])
%disp(['aecInNoise='dec2hex(aecInNoise*2^31)])
%disp(['anlpInNoise='dec2hex(anlpInNoise*2^31)])
%disp(['anlpComfortNoise(1)='. . .
%     dec2hex(anlpComfortNoise(1)*32768+
(anlpComfortNoise(1)<0)*65536)])
%disp(['anlpComfortNoise(2)='. . .
%     dec2hex(anlpComfortNoise(2)*32768+
(anlpComfortNoise(2)<0)*65536)])
%disp(['anlpArCoef='dec2hex(anlpArCoef*2^31)])
%disp(['anlpArGain='dec2hex(anlpArGain*32768)])
%disp(['aecChanGainTrial='dec2hex
(aecChanGainTrial*?)])
%disp(['aecChanGain='dec2hex(aecChanGain*32768)])
%disp(['aecVoiceGainBase='dec2hex
(aecvoiceGainBase*32768)])
%disp( [aecVoiceGain='dec2hex(aecvoiceGain*32768)])
%disp(['aecEchoGain='dec2hex(aecEchoGain*32768)].)
%disp(['aecDenom='dec2hex(aecDenom*8)1)
%disp(['aecNumer='dec2hex(aecNumer*2^18)])
%disp(['aecUpdateGain='dec2hex
(aecUpdateGain*32768)])
%disp(['aecCoef(1)='dec2hex(aeccoef(1)*32768+(aecCoef
(1)<0)*65536)])
%disp(['aecCoef(2)='dec2hex(aeccoef(2)*32768+(aecCoef
(2)<0)*65536)])
%disp(['anlpWindowGain='dec2hex
(anlpWindowGain*16384)])
%disp(['anlpEchoGain='dec2hex(anlpEchoGain*32768)])
%disp(['anlpEchoGain=']); 20*log10(anlpEchoGain)
%disp(['anlpComfortNoiseInOld='dec2hex
(anlpComfortNoiseInOld*32768)])
%disp(['anlpComfortNoiseOutOld='dec2hex
(anlpComfortNoiseOutOld*32768)])
%disp(['uplinkAudio(1)='. . .
% dec2hex(uplinkAudio(1)*32768+(uplinkAudio(1)<0)
*65536)])
%disp(['uplinkAudio(2)='. . .
% dec2hex(uplinkAudio(2)*32768+(uplinkAudio(2)<0)
*65536)])
%pause
%plot([abs(aecUpdate)/aecUpdateBase;
% zeros(AEC_REF_TAPS -AEC_REF_TAPS-AEC_
NEAR_TAPS, 1); . . .
% abs(aecUpdateNear)/aecUpdateBase])
%axis([0AEC_REF_TAPS 0 aecPeakToBase+0.1])
%xlabel('Update element'),ylabel('Normalized update
magnitude'),pause
%plot(20*log10(abs(aecCoef.*profile))),axis([0 AEC_
COEF_TAPS -100 1]);
%xlabel('Coefficient number'),ylabel('Magnitude in dB'),
pause
end
fclose(fidout);
clear AEC_MAX_GAIN_THRESH AEC_BASELINE_
THRESH AEC_STATUS_GAUGE_SCALER ONE
clear AEC_COEF_TAPS AEC_NEAR_TAPS AEC_
REF_TAPS
clear FRAME_SIZE FRAME_BITS ENERGY_SCALE
COMFORT_NOISE_SIZE
clear confirmedNoVoiceFlag
clear LRmatrix downlinkAudio uplinkAudio aecRef aecUp-
date aecUpdateNear aecOut
clear frame m k i anlpSeed aecEchoEst aecShiftPending
aecErrorShift ASM T
clear aecRefEnergy aecInEnergy aecOutEnergy anlpInEn-
ergy aecEchoEstEnergy
clear anlpIn anlpRef anlpRefEnvelope anlpDelta anlpOut-
Last
clear aecUpdatePeak2 aecUpdatePeak aecUpdateBase aec-
PeakToBase
clear aecStatusGauge aecDenom aecNumer aecUpdateGain
aecLoopEchoGain
clear aecInNoiseStateVars aecInEchoNoiseStateVars
anlpInNoiseStateVars
clear aecInVoice anlpInVoice aecInEchoVoice aecNearVoice
clear aecNearRatio aecNearGainLast anlpEchoGain
clear aecChanGainTrial anlpComfortNoiseIn anlpComfort-
NoiseOut
clear aecPeakGain anlpWindowGain anlpDenom anlpAr-
Gain error quotient ma
clear fidin fidout anlpNearSpeechCount anlpNearSpeech-
Flag ECHO_TO_NOISE_GOAL
% Estimate the noise frame energy based on the frame
energy of a signal.
% A norm-based noise estimate provides a wider dynamic
range with 32-bit
% variables, and thus the operation remains consistent even
at very low noise
% levels (such as the far end of test_65.raw). However, the
norm-based algo
% requires square-root and 32-bit-square operations (more
MIPS). This
% energy-based algo has been optimized for quantization of
low noise levels, and it
% does an acceptable job—especially considering that noise
level estimation
% is not critical for very low noise levels (voice is always
much larger than
% the noise). It also turns out that adaptation speeds can be
made the same
% for the norm-based and energy-based algos. All pumping
operations here use
% shifts—just shift one more bit for the norm-based algo.
% The goal is to update the estimate quickly when there is
no speech in the
% signal and slowly otherwise. Constant adaptation is
needed to track the car
% noise as it changes rapidly. The voice-activity detector
(VAD) output is a
```

% good start for determining when to update quickly, but it sometimes
% indicates no voice when there really is a low level of voice which is much
% higher than the noise. noVoiceFlag is the VAD output qualified by the
% status gauge of the linear echo canceler to improve the reliability.
% However, the status gauge does not differentiate noise from near-end speech,
% double-talk, or tones. Therefore, the algorithm must to tolerant of some
% speech during the fast update period. Where the status gauge works well is
% during far-end single talk, which is where it is most important for the
% noise estimate to be accurate to avoid audible echo. The trick used here to
% reduce false deviations (primarily occurring during near-end speech) is to
% pump the estimate up and down at fixed rates based on comparison results
% rather than linearly filter the energy signal. Using a pump-up time
% constant that is ¼ of the pump-down time constant biases the estimate
% toward the noise floor in spite of some voice. Pumping up and down by fixed
% increments instead of fixed time constants would result in a time constant
% that changes with noise level.
%
% It is difficult to tell the difference between a rising noise floor and
% speech. The pump-up time constants here determines the tracking rate.
% However, the pump-up is necessarily slow to minimize false growth during
% speech. State machines are implemented to allow a faster increase in the
% noise estimate under certain conditions. If the state machine sees the
% signal energy greater than 8 times the noise estimate for at least 900 ms
% during no voice, it is assumed that the noise floor has increased, and the
% noise floor is set equal to the test noise estimate from test period.
% When the input noise is dominated by noise from the far end, blanking due
% to the AMPS in-band control channel or due to poor RF conditions will
% cause the noise floor to temporarily drop. The state machine attempts to
% restore the noise estimate after blanking. First confirm that the energy
% drop is between 5 and 25 frames long. Then confirm that the energy returns
% back to the original level. If the energy remains within a window around
% the original noise level, a relatively short confirmation period is needed.
% If the energy jumps much higher than the original level, then voice could be
% occuring, and a longer confirmation period is needed to ensure that the
% noise floor has not dropped.
%
% Definition of noiseStateVars array:
% (1)=noise estimate
% (2)=noise estimate from before blanking or test noise estimate
% (3)=state variable/counter
function [confirmedNoVoiceFlag, noiseStateVars]=. . .
 estnoise(inEnergy, noVoiceFlag, noiseStateVars)
% Define the needed constants in the same way as the parent routine.
% The number of samples in the update integration period.
FRAME_SIZE=160;
% Number of bits to right shift values accumulated over a frame of samples.
FRAME_BITS=ceil(log2(FRAME_SIZE));
% Scale factor to quantize energies to 32 bits (Z8.23 format w/FRAME_SIZE=160)
ENERGY_SCALE=2^(31-FRAME_BITS);
% If the parent routine has initialized the noise estimate,
if noiseStateVars(1)==FRAME_SIZE,
 %
 % Take actions to speed up adaptation for the beginning of a call.
 %
 % Set the flag so that the comfort noise will initialize with this level.
 confirmedNoVoiceFlag=1;
 % Start with the noise estimate equal to the energy.
 noiseStateVars(1)=inEnergy;
else
 %
 % Update the noise estimate.
 %
 % By default, clear the flag so as to indicate no comfort noise training.
 confirmedNoVoiceFlag=0;
 %
 % The following bias test was performed in Matlab on white noise:
 % >>n=160*3000;noise=zeros(1,m);
 % >>seed=1;for i=1:n,[noise(i) seed]=noisegen(seed);end
 % >>m=3000;for i=1:m,noiseEnergy(i)=sum(noise(160*(i−1)+1:160*i).^2);end
 % >>ne=100;for i=1:m,if ne>noiseEnergy(i),
 % >>ne=ne-ne/16;else,ne=ne+ne/64;end,neh(i)=ne;end
 % >>plot(neh) % neh is the noise estimate history.
 % >>axis([0 20 0 100]) % Notice that neh settles after 10 frames.
 % >>1/(sum(neh(11:m))/(m-10)/(sum(noiseEnergy)/m)-1)
 % ans=-14.2082
 % This indicates that the noise estimate has a bias factor of about −1/14.
 % To simplify arithmetic, subtract a factor of 1/16 from the noise estimate
 % for comparison purposes to restore the bias.
 % In assembly, right shift before subtraction for bit exactness.
 noiseBiased=noiseStateVars(1)−noiseStateVars(1)/16;
 % Quantize to 32 bits
 noiseBiased=ceil(noiseBiased*ENERGY_SCALE)/ENERGY_SCALE;
 % If the VAD and status gauge indicate no voice,
 if noVoiceFlag,
  %
  % Pump the noise estimate quickly.
  %

```
% If the noise estimate is too high,
if noiseBiased>inEnergy,
%
% Pump the noise estimate down.
%
% To speed up tracking with a decreasing noise floor, it was tried to
% set the noise estimate equal to the signal energy immediately if the
% noise estimate was too high by a factor of 8. However, this made the
% bias very negative when activated, and it created problems with false
% detections. The time constant is so short that pumping the noise
% estimate down instead works quite well.
%
% To minimize the deviation, don't pump down when the noise estimate
% equals the signal energy.
%
% Quantization causes a minimum change of 1/ENERGY_SCALE, except at 0.
% In assembly, negate before right shift for bit exactness.
noiseStateVars(1)=noiseStateVars(1)-noiseStateVars(1)/16;
% Set the flag for comfort noise training. Requiring that the input
% energy be lower than the noise estimate improves the probability that
% comfort noise is not updated during voice.
confirmedNoVoiceFlag=1;
else
%
% Pump the noise estimate up.
%
% Use a minimum increment to avoid getting stuck near zero.
% Adding min(noiseStateVars(1)/64, 1/ENERGY_SCALE) is not used instead
% because it results in slower adaptation to suddenly increased noise.
noiseStateVars(1)=noiseStateVars(1)+noiseStateVars(1)/64+
        1/ENERGY_SCALE;
end
else
    % Pump the noise estimate slowly.
    % Adaptation is not stopped during voice because of the importance of
    % accurately tracking a decreasing noise floor. Over-estimation of the
    % noise causes under-estimation of the voice energy. This has more of an
    % impact on the NLP input than the linear echo canceler input due to the p % lower far-end voice energy. Thus, the result is insufficient echo
    % suppression. So it is better to under-estimate than over-estimate the
    % noise.
    %
    % If the noise estimate is too high,
    if noiseBiased>inEnergy,
    %
    % Pump the noise estimate down.
    %
    % Quantization causes a minimum change of 1/ENERGY_SCALE, except at 0.
    % In assembly, negate before right shift for bit exactness.
    noiseStateVars(1)=noiseStateVars(1)-noiseStateVars(1)/64;
    else
    %
    % Pump the noise estimate up.
    %
    % At first glance, it may seem that only pumping down during voice is
    % necessary to accurately track a decreasing noise floor. However, this
    % will cause the bias to become too strongly negative. The pump up rate
    % was empirically determined to be the fastest possible while not
    % allowing too much of a false change during voice. This turns out to
    % be very slow since voice can last for several seconds between pauses.
    % Don't use a minimum increment or else the ramp up will be too
    % large for low noise levels during voice.
    noiseStateVars(1)=noiseStateVars(1)+noiseStateVars(1)/1024;
    end
end
% Quantize to 32 bits
noiseStateVars(1)=floor(noiseStateVars(1)*ENERGY_SCALE)/ENERGY_SCALE;
% State machine for AMPS blanking and noise jump tracking.
% Don't execute at initialization.
%
% If the state machine is in the idle state,
if noiseStateVars(3)==0,
    % If the signal energy has significantly dropped below the noise estimate,
    % and if quantization of inEnergy does not give false results,
    if noiseStateVars(1)>max(8*inEnergy, 8/ENERGY_SCALE),
        % Store the noise estimate for the state machine.
        noiseStatevars(2)=noiseStateVars(1);
        % Start the state machine to look for blanking.
        noiseStateVars(3)=1;
        % If the VAD and status gauge indicate no voice, and the signal energy is
        % significantly higher than the noise estimate, and if quantization of
        % the noise estimate does not give false results,
    elseif noVoiceFlag&...
        (inEnergy>max(8*noiseStateVars(1), 8/ENERGY_SCALE)),
        % Initialize the test noise estimate.
        noiseStateVars(2)=inEnergy;
        % Start the state machine to look for a noise jump.
```

```
        noiseStateVars(3)=-1;
    end
% Else if the state machine is looking for a noise jump,
elseif noiseStateVars(3)<0,
    % If the VAD and status gauge continue to indicate no
voice, and if the
    % signal energy remains significantly higher than the
noise estimate,
    if noVoiceFlag&(inEnergy>8*noiseStateVars(1)),
        % Bias the test noise estimate just like the regular one.
        % In assembly, right shift before subtraction for bit
            exactness.
        noiseBiased=noiseStateVars(2)-noiseStateVars(2)/16;
        % Quantize to 32 bits
        noiseBiased=ceil(noiseBiased*ENERGY_SCALE)/
            ENERGY_SCALE;
        % If the test noise estimate is too high,
        if noiseBiased>inEnergy,
            % Pump the test noise estimate down.
            % Quantization causes a minimum change of
                1/ENERGY_SCALE.
            % In assembly, negate before right shift for bit exact-
                ness.
            noisestatevars(2)=noiseStateVars(2)-noiseStateVars
                (2)/16;
        else
            % Pump the test noise estimate up.
            noisestatevars(2)=noiseStateVars(2)+noiseStateVars
                (2)/64;
        end
        % Quantize to 32 bits
        noiseStateVars(2)=floor(noiseStateVars(2)*ENERGY_
            SCALE)/ENERGY_SCALE;
        % Decrement the state variable which also acts as a
            counter.
        noiseStateVars(3)=noiseStateVars(3)-1;
        % If the signal energy has remained significantly higher
            than the noise
        % estimate for a sufficient period,
        % (45 frames are needed for the echo of test track
            s_top10_1.raw)
        if noiseStateVars(3)==-45,
            % Jump the noise estimate to the test noise estimate.
            noiseStateVars(1)=noiseStateVars(2);
            % Reset the state machine back to the idle state.
            noiseStateVars(3)=0;
        end
    else,
        % Reset the state machine back to the idle state.
        noiseStateVars(3)=0;
    end
% Else the state machine is looking for blanking.
else,
    % Increment the state variable.
    noisestatevars(3)=noiseStateVars(3)+1;
    % States 1-100 count the number of frames in the alleged
blanking period.
    if noiseStateVars(3)<101,
        % If the energy goes back high,
        if 8*inEnergy>noiseStateVars(2),
            % If the blanking is less than 5 frames,
            if noiseStateVars(3)-1<5,
                % Either the detection was false or it is not worth
                    restoring the
                % noise estimate. Put the state machine back into
                    idle state.
                noiseStateVars(3)=0;
            else
                % Voice has occured or the noise has returned after
                    blanking.
                % Set the state variable to 101 to start the next phase.
                noiseStateVars(3)=101;
            end
        % If the count of low energy frames is too long,
        elseif noiseStateVars(3)-1==25,
            % Blanking did not occur—the noise floor dropped
                instead.
            % Put the state machine back into idle state.
            noiseStateVars(3)=0;
        end
    % The state machine has detected the end of the alleged
blanking period.
        % Regardless of whether the state machine is counting
frames of voice or
        % noise, first check if the energy goes back low.
        elseif 8*inEnergy<noiseStateVars(2),
            % Blanking did not occur—the noise floor dropped
                instead.
            % Put the state machine back into idle state.
            noiseStateVars(3)=0;
        % States 101-200 count the number of frames of voice or
noise following
        % the alleged blanking period.
        elseif noiseStateVars(3)<201,
            % If the energy is goes very high,
            if inEnergy>noiseStateVars(2)*8,
                % Assume that this is voice.
                % Set the state variable to 201 to start the next phase.
                noiseStateVars(3)=201;
            % If there is a sufficient count of frames where the
                maximum and minimum
            % energy is close to the saved noise estimate,
            elseif noiseStateVars(3)-101==10,
                % The blanking is confirmed.
                % Restore the noise estimate to that before the blank-
                    ing.
                noiseStateVars(1)=noiseStateVars(2);
                % Put the state machine back into idle state.
                noisestatevars(3)=0;
            end
        % States 201-300 count the number of frames of voice
following
        % the alleged blanking period.
        %
        % If there is a sufficient count of frames where the
minimum
        % energy is close to the saved noise estimate,
            elseif noiseStateVars(3)-201==50,
                % The blanking is confirmed.
                % Restore the noise estimate to that before the blanking.
                noiseStateVars(1)=noiseStateVars(2);
                % Put the state machine back into idle state.
                noiseStateVars(3)=0;
            end
    end
end
```

Those skilled in the art will appreciate that the present invention is not limited to the specific exemplary embodiments which have been described herein for purposes of illustration. For example, the various operational blocks of the disclosed embodiments are conceptual in nature. Actual implementation of the functions of such blocks can be accomplished using a variety of techniques. Furthermore, each exemplary system can be implemented, for example, using multiple standard digital signal processing chips, a single application-specific integrated circuit, or an appropriately configured computer.

Note also that, although the exemplary embodiments have been described in the context of acoustic echo canceling, the teachings of the present invention are equally applicable in the context of network echo canceling (e.g., where the near-end user is a landline user and the far-end user is a mobile user). Further, certain aspects of the present invention are applicable to communications systems generally and are not limited to echo suppression systems. Thus, the scope of the invention is defined by the claims which are appended hereto, rather than the foregoing description, and all equivalents which are consistent with the meaning of the claims are intended to be embraced therein.

I claim:

1. An echo suppression device, comprising:
    an echo suppressor configured to attenuate a first communications signal in order to suppress an echo component thereof, said echo component resulting from a reflection of a second communications signal; and
    a voice activity detector coupled to said echo suppressor and configured to provide an indication of whether said second communications signal includes a speech component,
    wherein said echo suppressor is deactivated only when said voice activity detector indicates that said second communications signal does not include a speech component.

2. An echo suppression device according to claim 1, wherein said echo suppressor is deactivated via a bypass.

3. An echo suppression device according to claim 1, wherein said echo suppressor is deactivated by adjusting the echo suppressor to provide a level of attenuation which is sufficient to prevent howling.

4. An echo suppression device according to claim 1, wherein said echo suppressor is a single-throw switch and wherein said echo suppressor is deactivated by closing said single-throw switch.

5. An echo suppression device according to claim 1, wherein said echo suppressor is a clipping suppressor and wherein said echo suppressor is deactivated by setting a clipping threshold of said echo suppressor to zero.

6. An echo suppression device according to claim 1, wherein said echo suppressor is a scaling suppressor and wherein said echo suppressor is deactivated by setting a scale factor of said echo suppressor to unity.

7. An echo suppression device according to claim 1, wherein said echo suppressor is a hybrid suppressor and wherein said echo suppressor is deactivated by setting a clipping threshold of said echo suppressor to zero and by setting a scale factor of said echo suppressor to unity.

8. An echo suppression device, comprising:
    an echo suppressor configured to attenuate a first communications signal in order to suppress an echo component thereof, wherein said echo component results from a reflection of a second communications signal, and wherein said echo suppressor multiplies at least a portion of said first communications signal by an attenuation factor; and
    a gain control processor configured to detect a prevailing condition of said communications signals and to adjust said attenuation factor based on said detected prevailing condition when said echo suppressor is active.

9. An echo suppression device according to claim 8, wherein said gain control processor includes a voice activity detector configured to detect whether said first communications signal includes a near-end speech component, and wherein said gain control processor adjusts said attenuation factor based upon whether said voice activity detector detects said near-end speech component.

10. An echo suppression device, comprising:
    an echo suppressor configured to attenuate a first communications signal in order to suppress an echo component thereof, said echo component resulting from a reflection of a second communications signal; and
    a gain control processor configured to detect a ratio of voice to noise in said first communications signal, wherein said gain control processor adjusts a level of attenuation provided by said echo suppressor based upon said ratio.

11. An echo suppression device according to claim 10, wherein said ratio of voice to noise is a ratio of echo to noise.

12. An echo suppression device according to claim 10, wherein said gain control processor deactivates said echo suppressor when said ratio is at or below a predefined threshold.

13. An echo suppression device according to claim 12, wherein said echo suppressor is deactivated via a bypass.

14. An echo suppression device according to claim 12, wherein said gain control processor deactivates said echo suppressor by adjusting the echo suppressor to provide a level of attenuation which is sufficient to prevent howling.

15. An echo suppression device according to claim 12, wherein said echo suppressor is a single-throw switch and wherein said echo suppressor is deactivated by closing said single-throw switch.

16. An echo suppression device according to claim 12, wherein said echo suppressor is a clipping suppressor and wherein said echo suppressor is deactivated by setting a clipping threshold of said echo suppressor to zero.

17. An echo suppression device according to claim 12, wherein said echo suppressor is a scaling suppressor and wherein said echo suppressor is deactivated by setting a scale factor of said echo suppressor to unity.

18. An echo suppression device according to claim 12, wherein said echo suppressor is a hybrid suppressor and wherein said echo suppressor is deactivated by setting a clipping threshold of said echo suppressor to zero and by setting a scale factor of said echo suppressor to unity.

19. An echo suppression device according to claim 10, wherein said echo suppressor multiplies at least a portion of said first communications signal by an attenuation factor, and wherein said gain control processor adjusts said attenuation factor to ensure that a ratio of voice to noise in an output of said echo suppression device is at or below a predefined threshold.

20. An echo suppression device according to claim 19, wherein said ratio of voice to noise is a ratio of echo to noise.

* * * * *

UNITED STATES PATENT AND TRADEMARK OFFICE
CERTIFICATE OF CORRECTION

PATENT NO. : 6,148,078
DATED : November 14, 2000
INVENTOR(S) : Romesburg

It is certified that error appears in the above-identified patent and that said Letters Patent is hereby corrected as shown below:

Column 8, line 10, please change "attenuation factor a" to --attenuation factor $\alpha$--.

Column 8, line 18, please change "attenuation factor a" to --attenuation factor $\alpha$--.

Column 8, line 49, please change "attenuation factor a" to --attenuation factor $\alpha$--.

Column 9, line 9, please change "attenuation factor a" to --attenuation factor $\alpha$--.

Column 10, line 43, please change "attenuation factor a" to --attenuation factor $\alpha$--.

Column 11, line 14, please change "step 510" to --step S10--.

Signed and Sealed this

Twenty-second Day of May, 2001

Attest:

NICHOLAS P. GODICI

Attesting Officer

Acting Director of the United States Patent and Trademark Office